(12) United States Patent
Yamazaki et al.

(10) Patent No.: US 7,373,082 B2
(45) Date of Patent: May 13, 2008

(54) LIGHT SHIELDING STRUCTURE OF A ZOOM LENS BARREL

(75) Inventors: Yoshihiro Yamazaki, Saitama (JP); Yuji Kogure, Saitama (JP)

(73) Assignee: PENTAX Corporation, Tokyo (JP)

( * ) Notice: Subject to any disclaimer, the term of this patent is extended or adjusted under 35 U.S.C. 154(b) by 435 days.

(21) Appl. No.: 11/198,228

(22) Filed: Aug. 8, 2005

(65) Prior Publication Data

US 2006/0034595 A1   Feb. 16, 2006

(30) Foreign Application Priority Data

Aug. 12, 2004   (JP) .............................. 2004-235437

(51) Int. Cl.
*G03B 17/00* (2006.01)
(52) U.S. Cl. ..................... 396/72; 396/82; 396/448; 359/695; 359/821
(58) Field of Classification Search ................ 396/72, 396/82, 448; 359/695, 821
See application file for complete search history.

(56) References Cited

U.S. PATENT DOCUMENTS

| | | | | |
|---|---|---|---|---|
| 5,365,373 A | * | 11/1994 | Tanaka ........................ | 359/601 |
| 5,420,656 A | * | 5/1995 | Kohmoto ..................... | 396/448 |
| 5,450,239 A | * | 9/1995 | Uziie et al. .................. | 359/601 |
| 6,424,807 B2 | | 7/2002 | Nomura et al. ................ | 396/72 |
| 6,520,691 B2 | | 2/2003 | Nomura et al. ............. | 396/448 |
| 6,813,441 B2 | | 11/2004 | Yamazaki ..................... | 396/82 |
| 6,919,995 B2 | | 7/2005 | Nomura et al. ............. | 359/695 |
| 2004/0141736 A1 | * | 7/2004 | Nomura ........................ | 396/72 |
| 2004/0156127 A1 | | 8/2004 | Nomura et al. ............. | 359/821 |

FOREIGN PATENT DOCUMENTS

JP   2004-258642   9/2004

OTHER PUBLICATIONS

English Language Abstract of JP 2004-258642.

* cited by examiner

*Primary Examiner*—W. B. Perkey
*Assistant Examiner*—Warren K Fenwick
(74) *Attorney, Agent, or Firm*—Greenblum & Bernstein, P.L.C.

(57) ABSTRACT

A light shielding structure of a zoom lens barrel includes an outer ring, an intermediate ring and an inner ring which are concentrically arranged, the intermediate ring being movable relative to the outer ring and including at least one through-slot, the inner ring being movable relative to the intermediate ring, and the inner ring including at least one projection which is formed on an outer peripheral surface of the inner ring to be engaged in the through-slot. The light shielding structure is in the form of a light shielding sheet including a fixing portion which is fixed to the inner ring, and at least one resilient light-shielding tongue which projects radially outwards from the fixing portion to pass through the through-slot so that a radially outer end portion of the resilient light-shielding tongue comes in contact with an inner peripheral surface of the outer ring.

16 Claims, 24 Drawing Sheets

LIGHT SHIELDING STRUCTURE OF A ZOOM LENS BARREL

BACKGROUND OF THE INVENTION

1. Field of the Invention

The present invention relates to a light shielding structure of a zoom lens barrel.

2. Description of the Related Art

In conventional zoom lens barrels, it is common practice to linearly guide lens frames, which support lens groups, in an optical axis direction by a linear guide mechanism. Although various types of such linear guide mechanisms have been proposed, it is basically the case that a set of linear guide grooves which extend parallel to an optical axis are formed on a stationary member while a set of followers which are respectively engaged in the set of linear guide grooves are formed on a movable member (e.g., a movable lens frame).

In zoom lens barrels produced in recent years, there has been a growing tendency for the aforementioned set of linear guide grooves to be formed as a set of linear guide slots (through-slots) for the purpose of miniaturizing the zoom lens barrel, especially for reducing the diameter of the zoom lens barrel. However, using such through-slots raises a possibility of harmful light such as stray light entering into an optical path of the zoom lens barrel through the linear guide slots, and hence, reaching the picture plane (e.g., an imaging surface of an image pickup device or a sensitive surface of silver-salt film). Specifically, since the relative position of a plurality of lens frames varies in a zooming operation, harmful light which has nothing to do with the photographing operation may reach the picture plane through the set of linear guide slots in some specific relative position of the plurality of lens frames to impair an obtained object image. To prevent this problem from occurring, it is common practice to provide a light shielding structure for preventing such harmful light from entering into an optical path of the zoom lens barrel to reach a picture plane. However, it is difficult to obtain a simple light shielding structure which is effective over the entire zooming range because the relative position of the plurality of lens frames in the optical axis direction varies in a zooming operation.

SUMMARY OF THE INVENTION

The present invention provides a zoom lens barrel including a lens frame on which at least one through-slot is formed, wherein harmful light can be prevented from reaching the picture plane through the through-slot by a simple light shielding structure using a light shielding member.

According to an aspect of the present invention, a light shielding structure of a zoom lens barrel is provided, including an outer ring, an intermediate ring and an inner ring which are concentrically arranged, the intermediate ring being movable relative to the outer ring and including at least one through-slot, the inner ring being movable relative to the intermediate ring, and the inner ring including at least one projection which is formed on an outer peripheral surface of the inner ring to be engaged in the through-slot. The light shielding structure is in the form of a light shielding sheet including a fixing portion which is fixed to the inner ring, and at least one resilient light-shielding tongue which projects radially outwards from the fixing portion to pass through the through-slot so that a radially outer end portion of the resilient light-shielding tongue comes in contact with an inner peripheral surface of the outer ring.

It is desirable for the light shielding structure to include a light shielding sheet deforming frame positioned between the intermediate ring and the outer ring, the light shielding sheet deforming frame moving in an optical axis direction relative to the intermediate ring and the outer ring in accordance with a zooming operation of the zoom lens barrel. The light shielding sheet deforming frame resiliently deforms the resilient light-shielding tongue to change the resilient light-shielding tongue from a first state in which the resilient light-shielding tongue is in contact with the outer ring to a second state in which the resilient light-shielding tongue is in contact with the light shielding sheet deforming frame when the light shielding sheet deforming frame comes into contact with the resilient light-shielding tongue.

It is desirable for the through-slot to be elongated in a direction parallel to an optical axis of the zoom lens barrel to serve as linear guide slot.

It is desirable for the outer ring to include a cam ring which is rotated to move the intermediate ring, the inner ring, and the light shielding sheet deforming frame in predetermined respective moving manners thereof, respectively.

It is desirable for the light shielding sheet deforming frame to include an inner ring portion and an outer ring portion positioned radially outside of the inner ring portion. The cam ring is positioned between the inner ring portion and the outer ring portion of the light shielding sheet deforming frame. The radially outer end portion of the resilient light-shielding tongue is resiliently deformed by the inner ring portion of the light shielding sheet deforming frame.

It is desirable for the light shielding sheet deforming frame, the intermediate ring and the inner ring to include a first lens group moving frame, a second lens group moving frame, and a third lens group moving frame, respectively. The first lens group moving frame, a second lens group moving frame, and a third lens group moving frame support a first lens group, a second lens group and a third lens group, respectively, arranged in that order from an object side.

It is desirable for the through-slot of the intermediate ring to include a guide groove which guides the light shielding sheet deforming frame and the inner ring.

It is desirable for the projection of the inner ring to be engaged with the light shielding sheet deforming frame through the through-slot of the intermediate ring.

It is desirable for the zoom lens barrel to be a retractable zoom lens barrel including a lens system, wherein a position of the lens system changes between a ready-to-photograph position and a retracted position.

It is desirable for the lens system to include a zoom lens optical system which changes a focal length during a zooming operation. The light shielding sheet deforming frame, the intermediate ring and the inner ring support three lens groups of the zoom lens optical system, respectively.

It is desirable for the fixing portion of the light shielding sheet to be bonded to a rear surface of the inner ring.

It is desirable for the projection of the inner ring to be elongated in an optical axis direction of the zoom lens barrel, and for the fixing portion of the light shielding sheet to be fixed to the inner ring behind a rear end of the projection of the inner ring.

It is desirable for the light shielding sheet deforming frame ring to include at least one through-slot.

It is desirable for the through-slot of the light shielding sheet deforming frame to be elongated in a direction parallel to an optical axis of the zoom lens barrel to serve as a linear guide slot.

In an embodiment, a zoom lens barrel is provided, including an outer ring, an intermediate ring and an inner ring which are concentrically arranged. The intermediate ring is movable relative to the outer ring in an optical axis direction, supports a front lens group, and includes at least one through-slot which is elongated in the optical axis direction. The inner ring is movable relative to the intermediate ring in the optical axis direction, and supports a rear lens group. The inner ring includes at least one linear guide projection which is elongated in the optical axis direction to be engaged in the through-slot, respectively. The light shielding structure includes a ring-shaped light shielding sheet which is fixed to the inner ring to be positioned around an optical path of a zoom lens system including the front lens group and a rear lens group. The ring-shaped light shielding sheet includes at least one resilient light-shielding tongue which projects radially outwards to pass through the through-slot so that a radially outer end portion of the resilient light-shielding tongues comes in contact with an inner peripheral surface of the outer ring.

It is desirable for the zoom lens barrel to include an axially-elongated member which is elongated in an optical axis direction between the intermediate ring and the outer ring, and is moved in the optical axis direction relative to the intermediate ring and the outer ring in accordance with a zooming operation of the zoom lens barrel. The axially-elongated member resiliently deforms the resilient light-shielding tongue to change the resilient light-shielding tongue from a first state, in which the resilient light-shielding tongue is in contact with the outer ring, to a second state, in which the resilient light-shielding tongue is in contact with the axially-elongated member when the axially-elongated member comes into contact with the resilient light-shielding tongue.

According to the present invention, harmful light can be prevented from reaching the picture plane through the through-slot by a simple light shielding structure that includes a fixing portion which is fixed to the inner ring, and at least one resilient light-shielding tongue which projects radially outwards from the fixing portion to pass through the through-slot so that a radially outer end portion of the resilient light-shielding tongue comes in contact with an inner peripheral surface of the outer ring.

The present disclosure relates to subject matter contained in Japanese Patent Application No. 2004-235437 (filed on Aug. 12, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

An embodiment of a zoom lens barrel according to the present invention which will be hereinafter discussed with reference to the accompanying drawings is an improved embodiment of the zoom lens barrel proposed by the assignee of the present invention in, e.g., Japanese Unexamined Patent Publication No. 2003-27341. The overall structure of this improved embodiment of the zoom lens barrel according to the present invention will be hereinafter discussed with reference to FIGS. 1 through 19.

Figure 1:
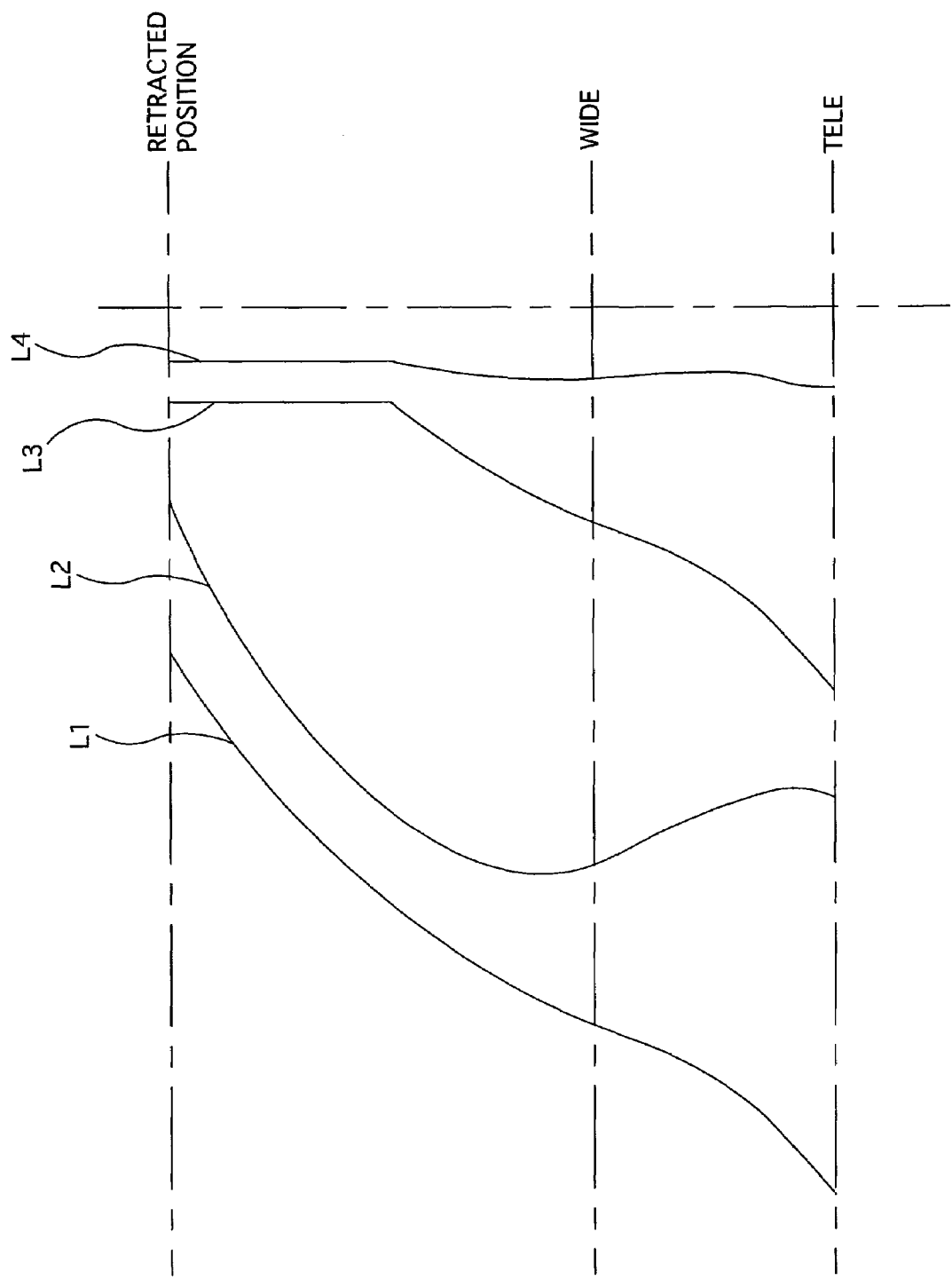
FIG. 1 is a diagram showing reference moving paths of zoom lens groups of a zoom lens system provided in an embodiment of a zoom lens barrel according to the present invention.
Figure 2:
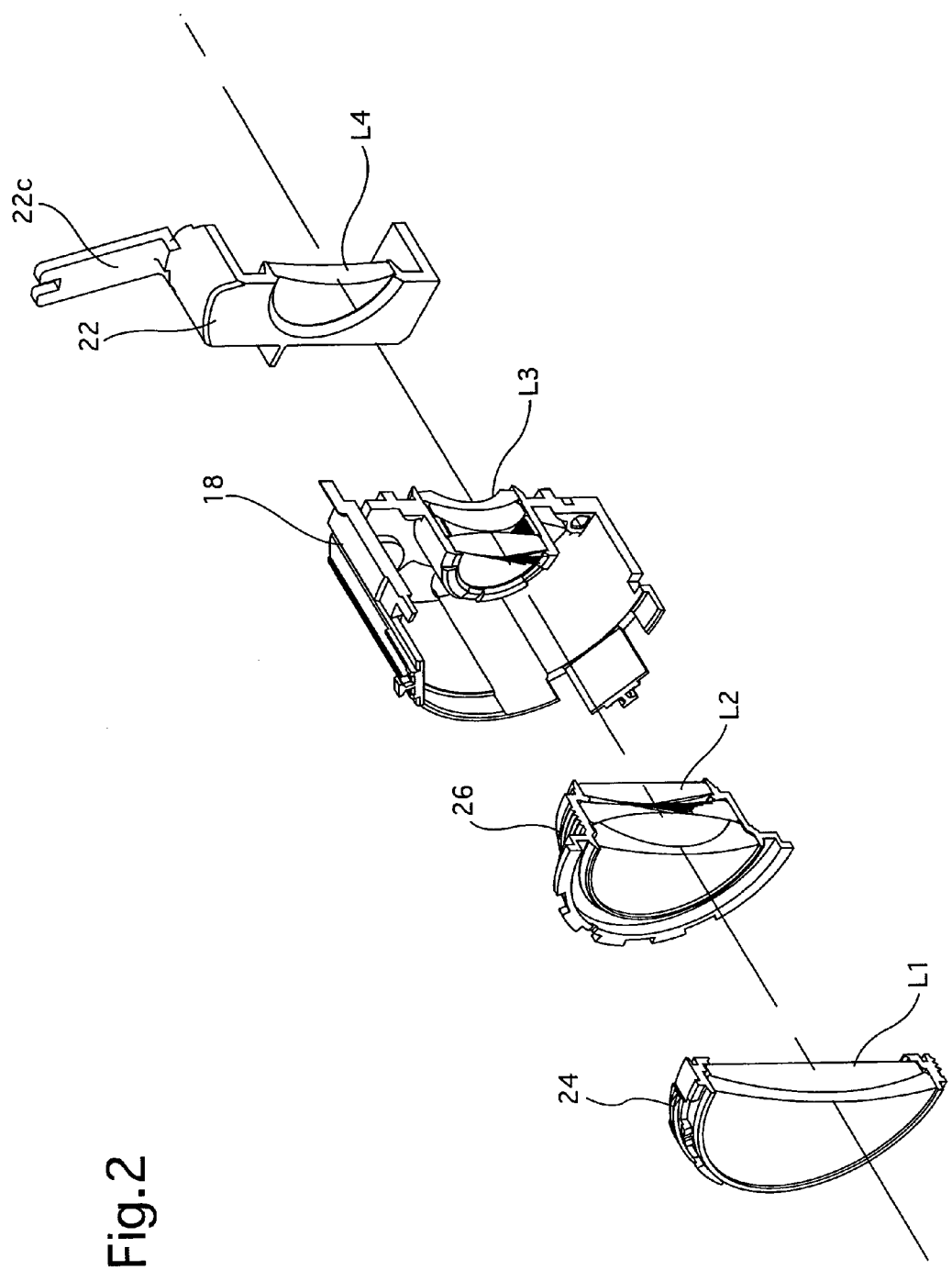
FIG. 2 is an exploded perspective view of an axial section of the zoom lens groups and lens support frames therefor.
Figure 3:
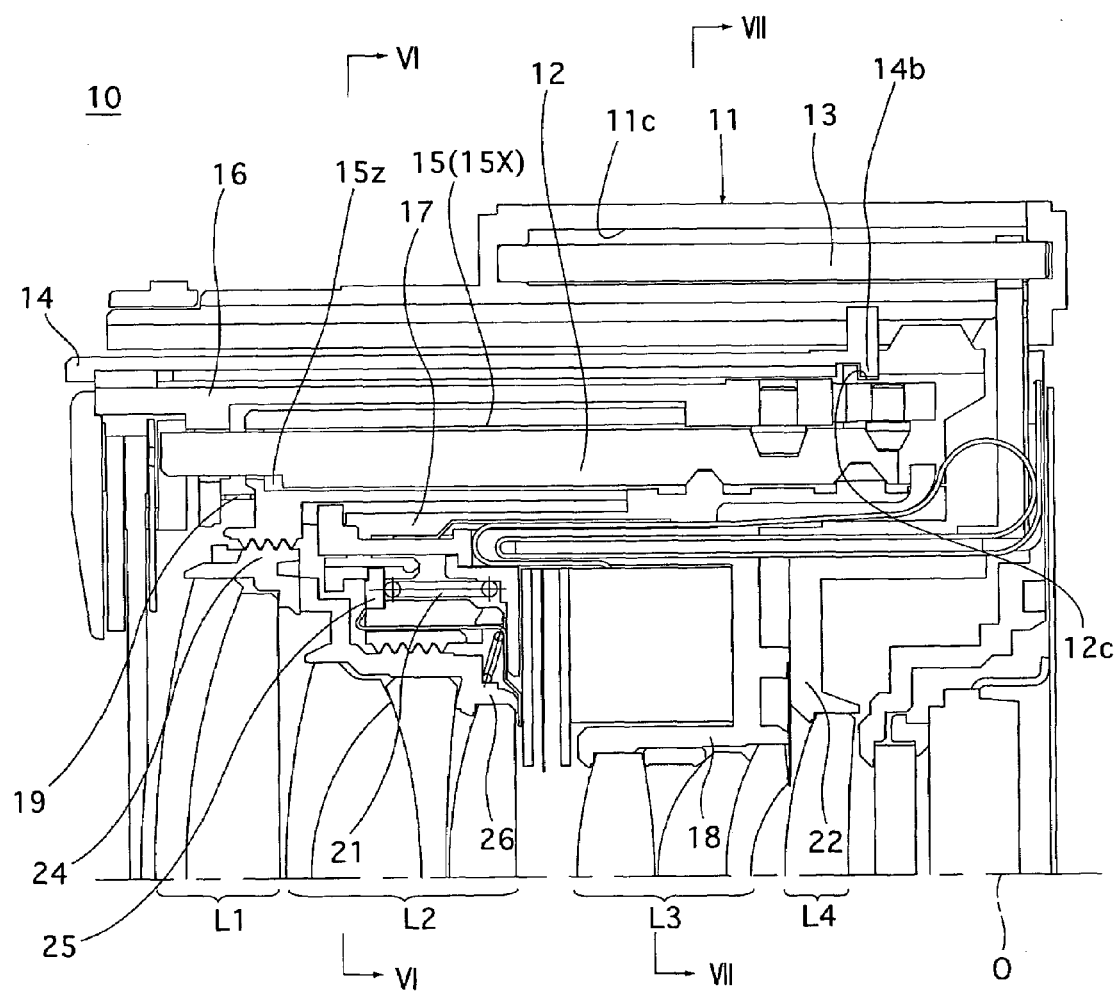
FIG. 3 is a longitudinal cross sectional view of the embodiment of the zoom lens barrel according to the present invention, showing an upper half of the zoom lens barrel from the optical axis thereof in a retracted state.

A zoom lens system of the zoom lens barrel 10 is a vari-focal lens system consisting of four lens groups: a positive first lens group L1, a negative second lens group L2, a positive third lens group L3 and a positive fourth lens group L4, in that order from the object side (left side as viewed in FIG. 3). The first through third lens groups L1, L2 and L3 are moved relative to one another along an optical axis O to vary the focal length of the zoom lens system and the fourth lens group L4 is moved along the optical axis O to make a slight focus adjustment, i.e., to adjust a slight focus deviation caused by the variation of the focal length. During the operation of varying the focal length of the zoom lens system between a wide-angle focal length and a telephoto focal length, the first lens group L1 and the third lens group L3 move along the optical axis while maintaining the distance therebetween. The fourth lens group L4 also serves as a focusing lens group. FIG. 1 shows both moving paths of the first through fourth lens groups L1 through L4 during the zooming operation and moving paths for the advancing/retracting operation.

Figure 8:
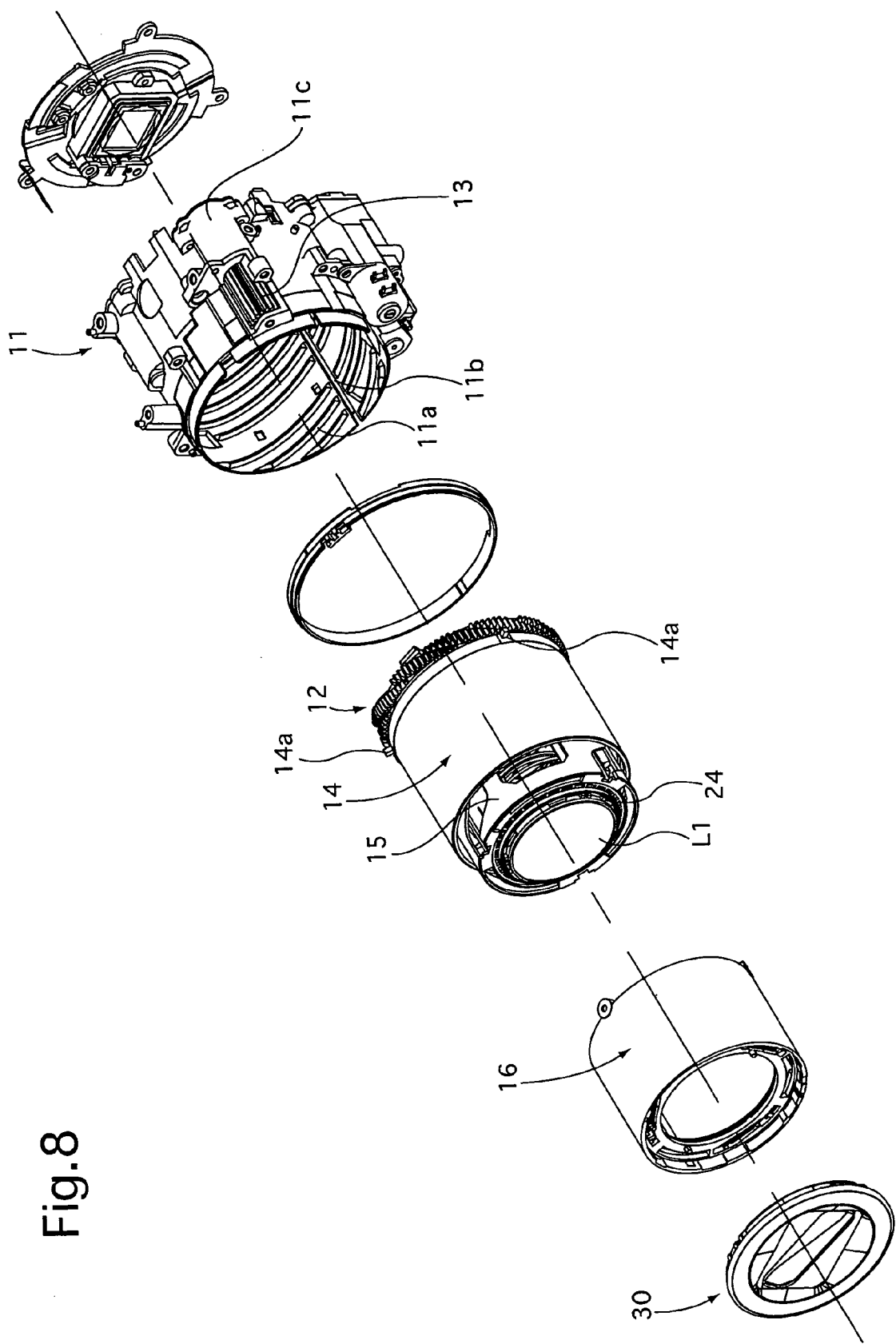
FIG. 8 is an exploded perspective view of a portion of the zoom lens barrel shown in FIG. 3.
Figure 9:
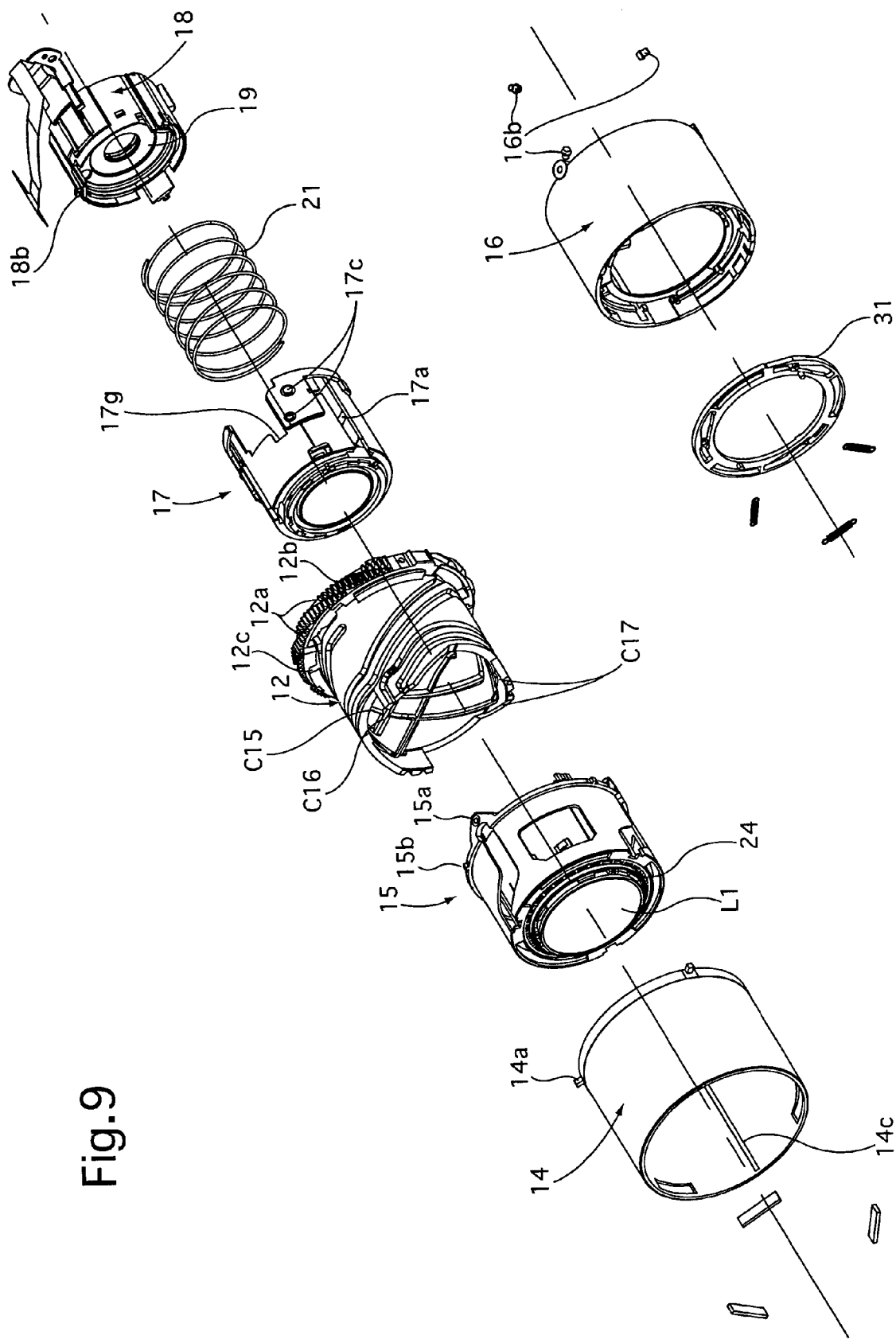
FIG. 9 is an exploded perspective view of a portion of the zoom lens barrel shown in FIG. 3.
Figure 10:
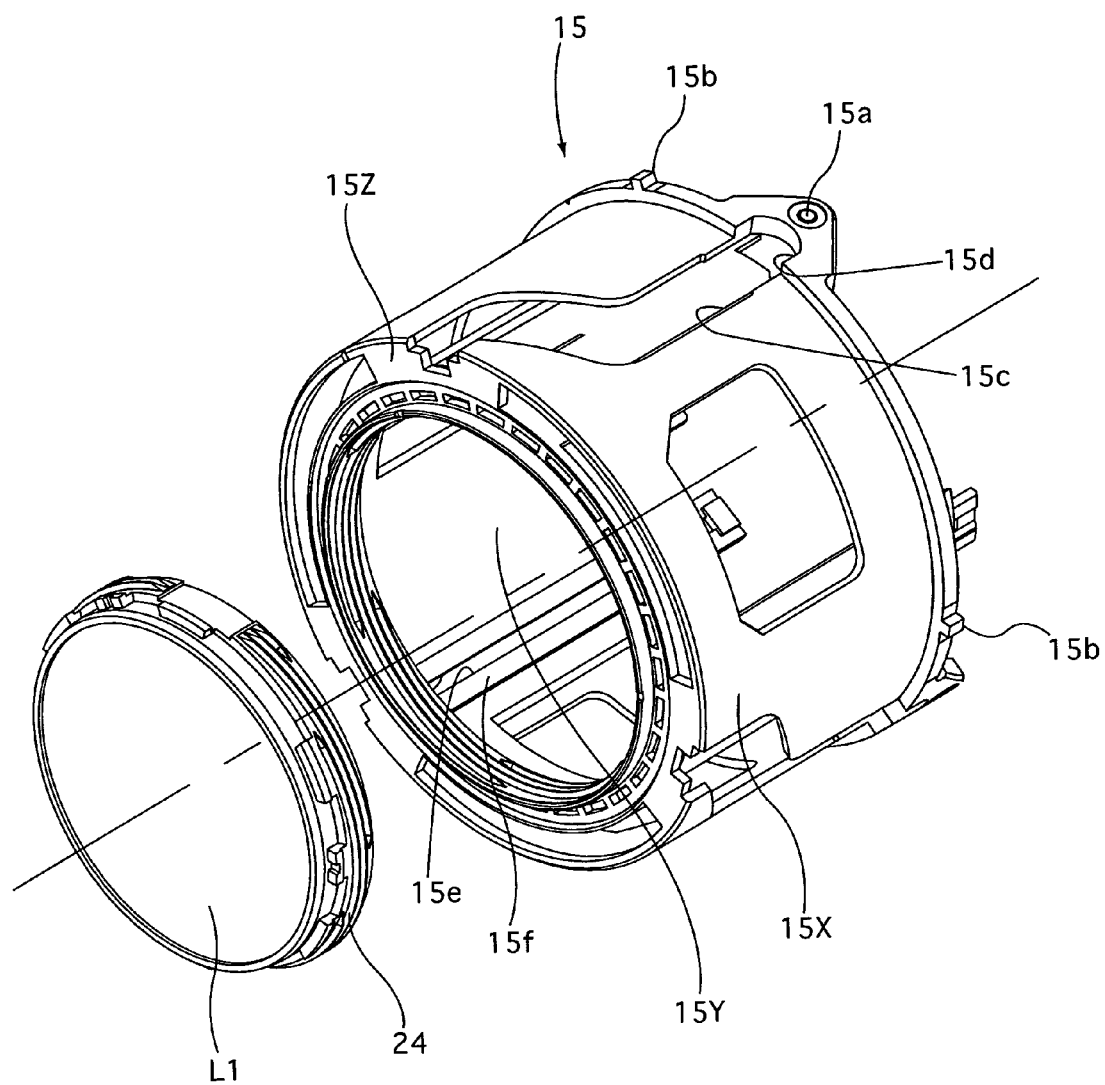
FIG. 10 is an exploded perspective view of a portion of the zoom lens barrel shown in FIG. 3, showing a first lens group moving ring and peripheral elements.

The zoom lens barrel 10 is provided with a stationary barrel 11 which is fixed to a camera body (not shown). As shown in FIG. 8, the stationary barrel 11 is provided on an inner peripheral surface thereof with a female helicoid 11a and a set of three linear guide grooves 11b which extend parallel to the optical axis O. The zoom lens barrel 10 is provided inside the stationary barrel 11 with a cam/helicoid ring (cam ring/outer ring) 12. As shown in FIG. 9, the cam/helicoid ring 12 is provided, on an outer peripheral surface thereof in the vicinity of the rear end of the cam/helicoid ring 12, with a male helicoid 12a which is engaged with the female helicoid 11a of the stationary barrel 11. The cam/helicoid ring 12 is provided on the thread of the male helicoid 12a with a spur gear 12b which is always engaged with a drive pinion 13 (see FIG. 15). The drive pinion 13 is provided in a recessed portion 11c (see FIG. 3) formed on an inner peripheral surface of the stationary barrel 11. The drive pinion 13 is supported by the stationary barrel 11 to be freely rotatable in the recessed portion 11c on an axis of the drive pinion 13.

Accordingly, forward and reverse rotations of the drive pinion 13 cause the cam/helicoid ring 12 to move forward rearward along the optical axis O while rotating about the optical axis O due to the engagement of the drive pinion 13 with the spur gear 12b and the engagement of the female helicoid 11a with the male helicoid 12a. In the present embodiment of the zoom lens barrel 10, the cam/helicoid ring 12 is the only element thereof which rotates about the optical axis O.

The zoom lens barrel 10 is provided around the cam/helicoid ring 12 with a linear guide ring 14. The linear guide ring 14 is provided, on an outer peripheral surface thereof at the rear end of the linear guide ring 14, with a set of three linear guide projections 14a which project radially outwards to be engaged in the set of three linear guide grooves 11b of the stationary barrel 11, respectively. The linear guide ring 14 is provided, on an inner peripheral surface thereof at the rear end of the linear guide ring 14, with a set of three bayonet lugs 14b (only one of them appears in FIGS. 3 through 5). The cam/helicoid ring 12 is provided, on an outer peripheral surface thereof immediately in front of the male helicoid 12a (the spur gear 12b), with a circumferential groove 12c in which the set of three bayonet lugs 14b are engaged to be rotatable about the optical axis O in the circumferential groove 12c. Accordingly, the linear guide ring 14 is linearly movable along the optical axis O together with the cam/helicoid ring 12 without rotating about the optical axis O.

Figure 4:
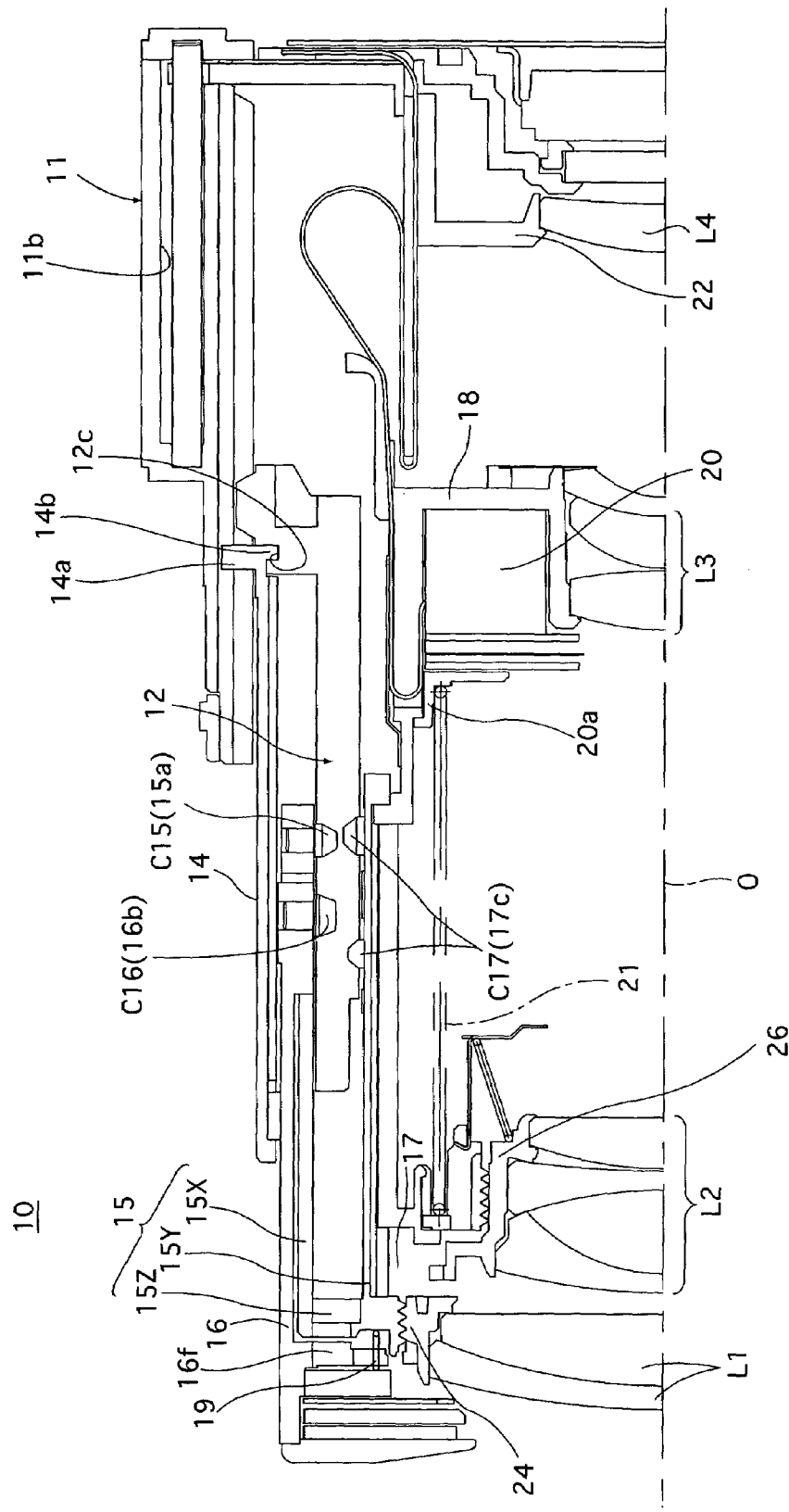
FIG. 4 is a view similar to that of FIG. 3, and shows an upper half of the zoom lens barrel from the optical axis thereof at the wide-angle extremity.
Figure 16:
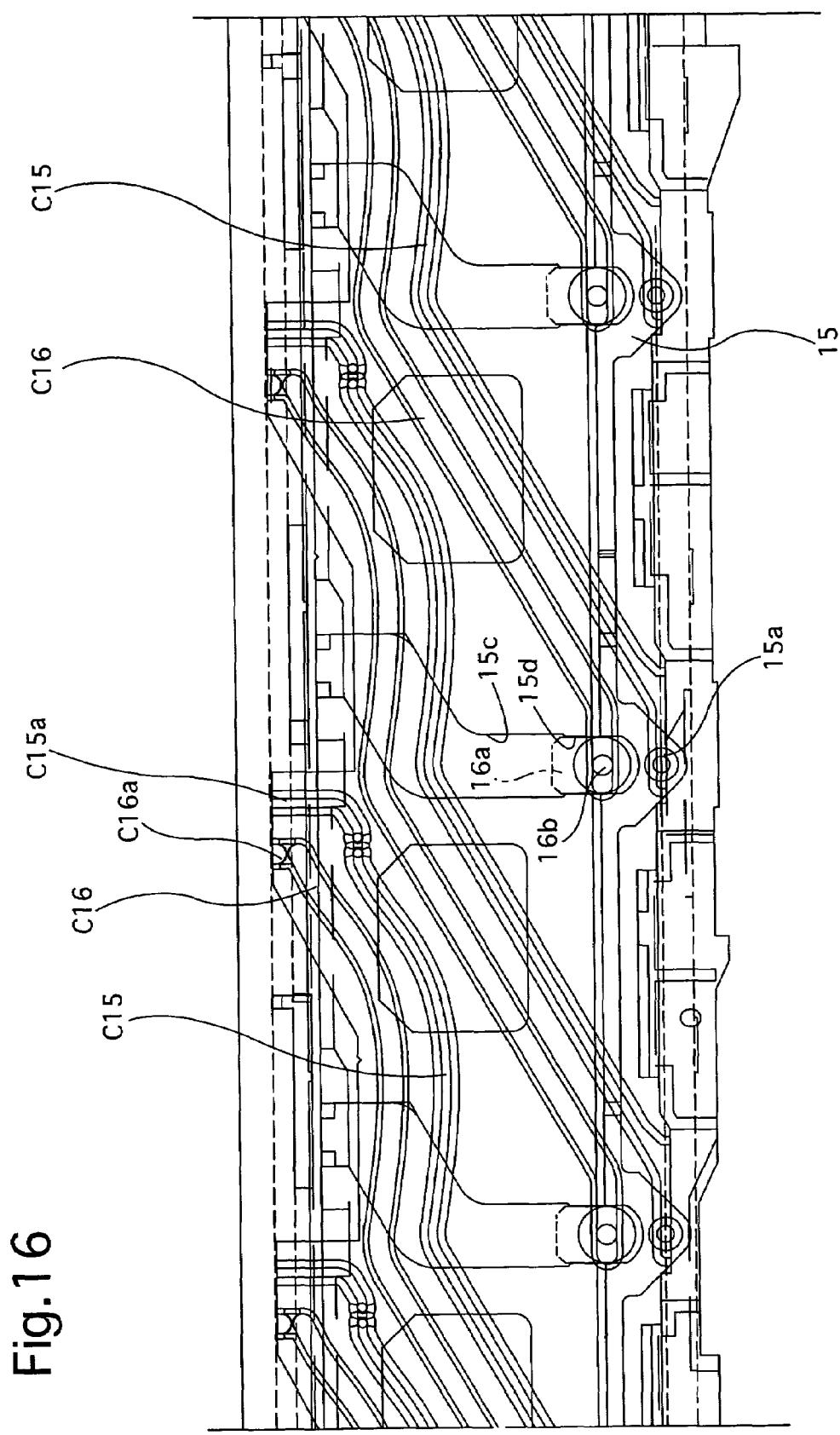
FIG. 16 is a developed view of a cam/helicoid ring, showing a set of first cam grooves of the cam/helicoid ring for moving the first lens group and a set of third cam grooves of the cam/helicoid ring for moving an exterior ring.

The zoom lens barrel 10 is provided around the cam/helicoid ring 12 with a first lens group moving ring (light shielding sheet deforming frame) 15 which supports the first lens group L1, and is further provided around the first lens group moving ring 15 with an exterior ring 16. The zoom lens barrel 10 is provided inside the cam/helicoid ring 12 with a second lens group moving ring (intermediate ring) 17 which supports the second lens group L2. As shown in FIGS. 4, 9 and 16, the cam/helicoid ring 12 is provided on an outer peripheral surface thereof with a set of three first cam grooves C15 for moving the first lens group moving ring 15 and a set of three second cam grooves C16 for moving the exterior ring 16, and is further provided on an inner peripheral surface of the cam/helicoid ring 12 with a set of six third cam grooves C17 for moving the second lens group moving ring 17 (see FIG. 19).

The set of three first cam grooves C15 and the set of three second cam grooves C16 are slightly different in shape, and are apart from one another at predetermined intervals in a circumferential direction of the cam/helicoid ring 12. The set of six third cam grooves C17 have the same basic cam diagrams, and includes three front third cam grooves C17, and three rear third cam grooves C17 which are positioned behind the three front third cam grooves C17 in the optical axis direction (vertical direction as viewed in FIG. 19). The three front third cam grooves C17 are apart from one another in a circumferential direction of the cam/helicoid ring 12 while the three rear third cam grooves C17 are apart from one another in a circumferential direction of the cam/helicoid ring 12. Each of the first lens group moving ring 15, the exterior ring 16 and the second lens group moving ring 17 is linearly guided along the optical axis O. A rotation of the cam/helicoid ring 12 causes the first lens group moving ring 15, the exterior ring 16 and the second lens group moving ring 17 to move along the optical axis O in accordance with the contours of the set of three first cam grooves C15, the set of three second cam grooves C16 and the set of six third cam grooves C17, respectively.

Figure 5:
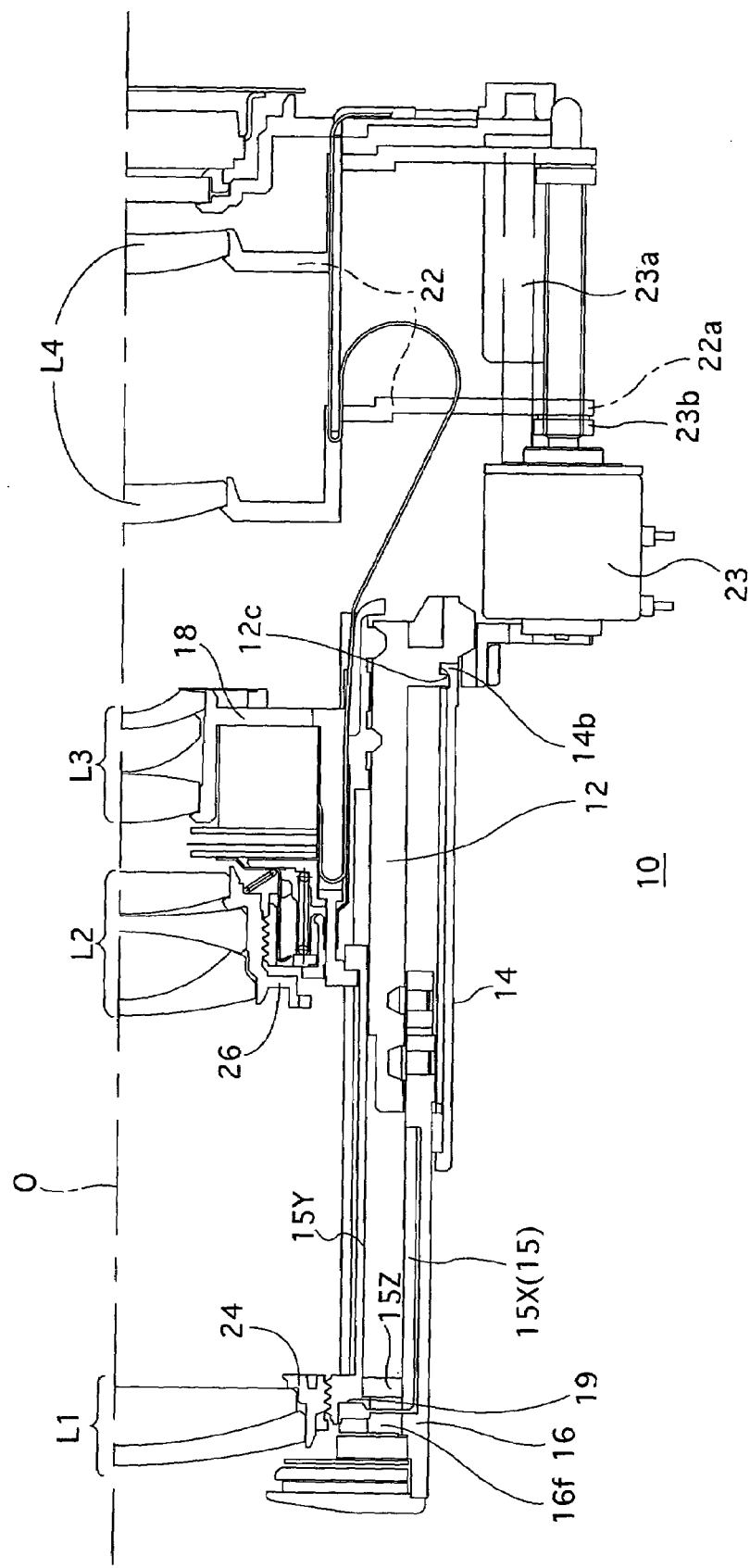
FIG. 5 is a view similar to that of FIG. 3, and shows a lower half of the zoom lens barrel from the optical axis thereof at the telephoto extremity.

Linear guide relationship (linear guide mechanical structure) among the first lens group moving ring 15, the exterior ring 16 and the second lens group moving ring 17 will be discussed hereinafter. As shown in FIGS. 4 and 5, the first lens group moving ring 15 is provided with an outer ring portion 15X, an inner ring portion 15Y and a flange wall 15Z by which the front end of the outer ring portion 15X and the front end of the inner ring portion 15Y are connected to have a substantially U-shaped cross section. The cam/helicoid ring 12 is positioned between the outer ring portion 15X and the inner ring portion 15Y. Three cam followers 15a which are respectively engaged in the set of three first cam grooves C15 are fixed to the outer ring portion 15X in the vicinity of the rear end thereof. The zoom lens barrel 10 is provided with a first lens group support frame 24 which supports the first lens group L1. As shown in FIGS. 8 and 9, the first lens group support frame 24 is fixed to the inner ring portion 15Y at the front end thereof through a male thread portion and a female thread portion which are formed on an outer peripheral surface of the first lens group support frame 24 and an inner peripheral surface of the inner ring portion 15Y, respectively. The first lens group support frame 24 can be rotated relative to the first lens group moving ring 15 to adjust the position of the first lens group support frame 24 along the optical axis O relative to the first lens group moving ring 15 to carry out a zooming adjustment (which is an adjustment operation which is carried out in a manufacturing process of the zoom lens barrel if necessary).

The linear guide ring 14, which is linearly guided along the optical axis O by the stationary barrel 11, is provided, on an inner peripheral surface thereof at approximately equiangular intervals (intervals of approximately 120 degrees), with a set of three linear guide grooves 14c (only one of them appears in FIG. 9), while the outer ring portion 15X of the first lens group moving ring 15 is provided at the rear end thereof with a set of three linear guide projections 15b (see FIG. 10) which project radially outwards to be engaged in the set of three linear guide grooves 14c, respectively. The outer ring portion 15X is provided with a set of three assembly slots 15c (see FIGS. 10 and 16), and is further provided at the rear ends of the set of three assembly slots 15c with a set of linear guide slots 15d (see FIG. 16) which are communicatively connected with the set of three assembly slots 15c and are smaller in width than the set of three assembly slots 15c, respectively. Three linear guide keys 16a which are fixed to the exterior ring 16 which is positioned between the outer ring portion 15X and the linear guide ring 14 are engaged in the set of linear guide slots 15d, respectively.

The maximum relative moving distance between the first lens group moving ring 15 and the exterior ring 16 along the optical axis O (the difference in shape between the set of three first cam grooves C15 and the set of three second cam grooves C16) is only a slight distance, and the length of each linear guide slot 15d in the optical axis direction is correspondingly short. A set of three cam followers 16.b which are engaged in the set of three second cam grooves C16 are fixed to the set of three linear guide keys 16a, respectively (see FIGS. 7 and 9).

The zoom lens barrel 10 is provided between the first lens group moving ring 15 and the exterior ring 16 with a compression coil spring 19 (see FIGS. 3 through 5). The compression coil spring 19 biases the first lens group moving ring 15 rearward to remove backlash between the set of three first cam grooves C15 and the set of three cam followers 15a, and at the same time, biases the exterior ring 16 forward to remove backlash between the set of three second cam grooves C16 and the set of three cam followers 16b.

As shown in FIG. 16, the set of three first cam grooves C15 and the set of three second cam grooves C16 are shaped slightly different from each other in their respective retracting positions compared to their respective photographing ranges (zooming ranges), so that the exterior ring 16 (see FIG. 3) advances from the photographing position thereof relative to the first lens group moving ring 15 to prevent barrier blades of a lens barrier unit 30 (see FIG. 8) and the first lens group L1 from interfering with each other when the zoom lens barrel 10 is fully retracted as shown in FIG. 3. As can be seen in FIG. 3, a clearance between the flange wall 15Z of the first lens group moving ring 15 and a flange wall 16f of the exterior ring 16 when the zoom lens barrel 10 is in the retracted position is greater than when the zoom lens barrel 10 is in a ready-to-photograph position as shown in FIG. 4 or 5.

In other words, when the zoom lens barrel 10 is in a ready-to-photograph position as shown in FIG. 4 or 5, the flange wall 15Z of the first lens group moving ring 15 and the flange wall 16f of the exterior ring 16 are positioned close to each other to prevent vignetting from occurring which may be caused by the lens barrier unit 30. The lens barrier unit 30 is supported by the exterior ring 16 at the front end thereof. The zoom lens barrel 10 is provided, immediately behind the lens barrier unit 30 (between the lens barrier unit 30 and the flange wall 16f of the exterior ring 16), with a barrier opening/closing ring 31 (see FIG. 9). Rotating the barrier opening/closing ring 31 at the retracted position via rotation of the cam/helicoid ring 12 causes the barrier blades of the lens barrier unit 30 to open and shut. The mechanism for opening and closing the barrier blades using a barrier opening/closing ring such as the barrier opening/closing ring 31 is known in the art.

The front end of each second cam groove C16 is open on a front end surface of the cam/helicoid ring 12 to be formed as an open end C16a (see FIG. 16) through which the associated cam follower 16b of the exterior ring 16 is inserted into the second cam groove C16. Likewise, the front end of each first cam groove C15 is open on a front end surface of the cam/helicoid ring 12 to be formed as an open end C15a (see FIG. 16) through which the associated cam follower 15a of the first lens group moving ring 15 is inserted into the first cam groove C15.

Figure 6:
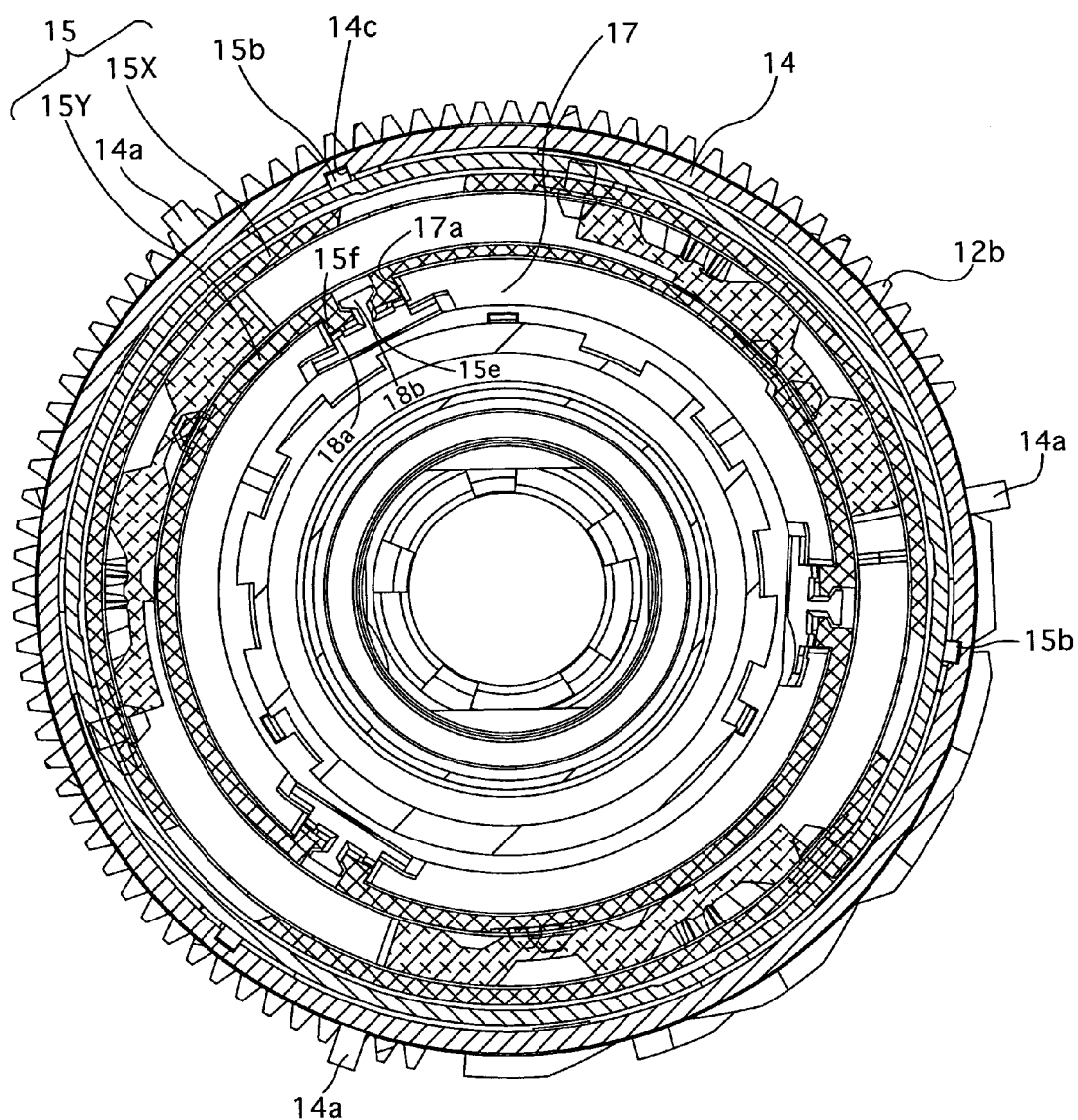
FIG. 6 is a transverse cross sectional view taken along a VI-VI line shown in FIG. 3.
Figure 7:
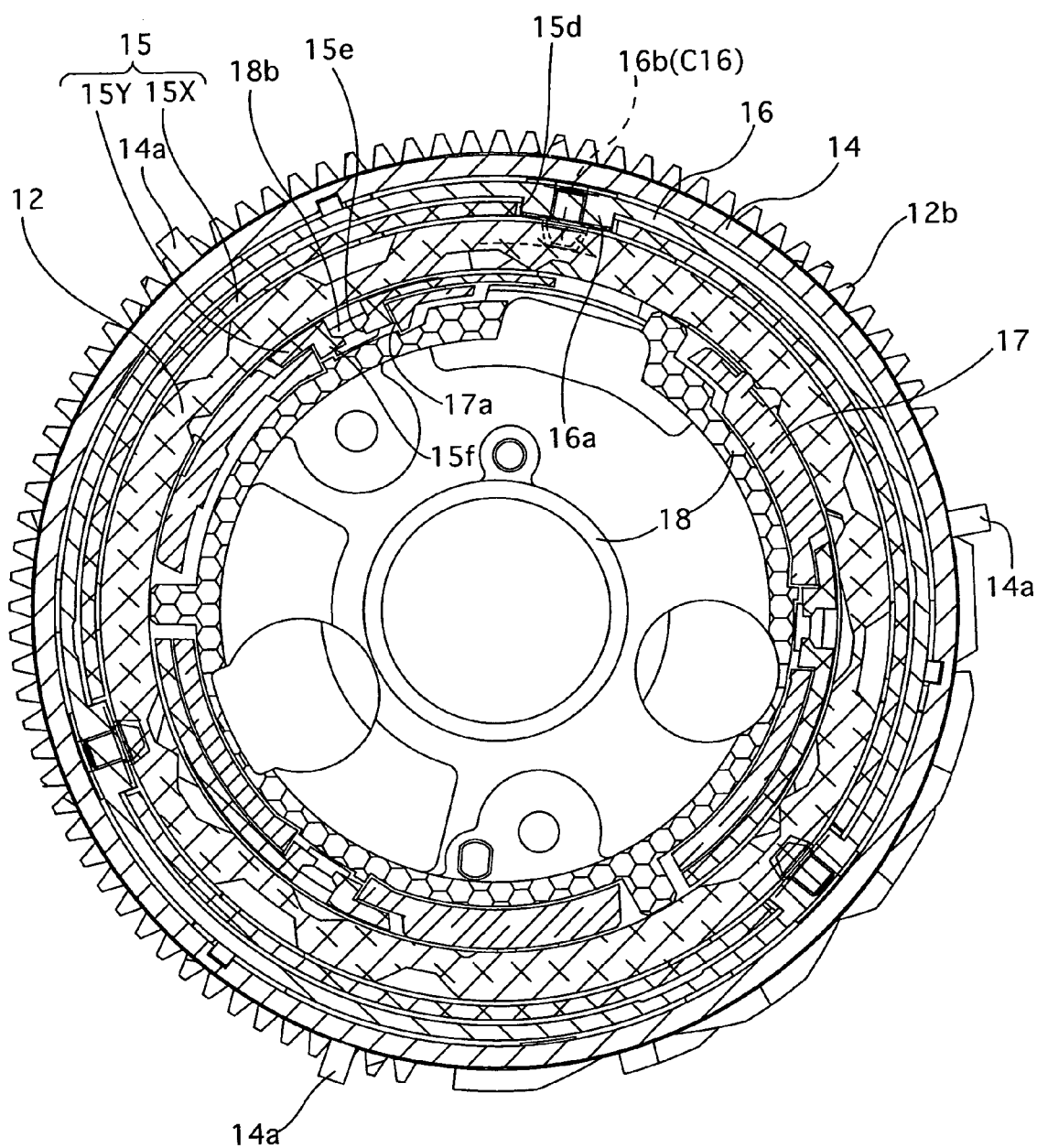
FIG. 7 is a transverse cross sectional view taken along a VII-VII line shown in FIG. 3.
Figure 17:
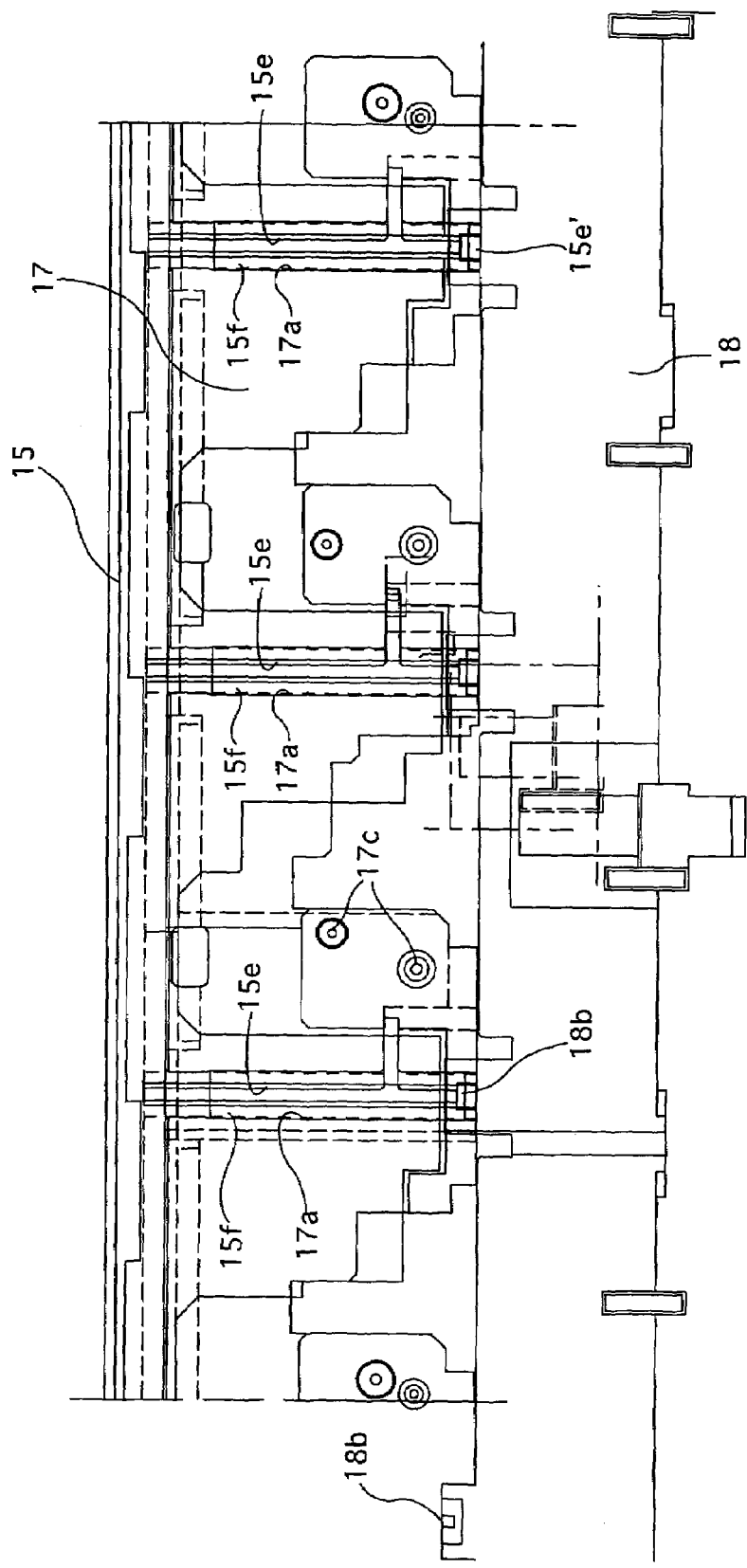
FIG. 17 is a developed view of the first lens group moving ring, the second lens group moving ring and the third lens group moving ring, showing linear guide mechanical linkages among the first through third lens group moving rings.
Figure 18:
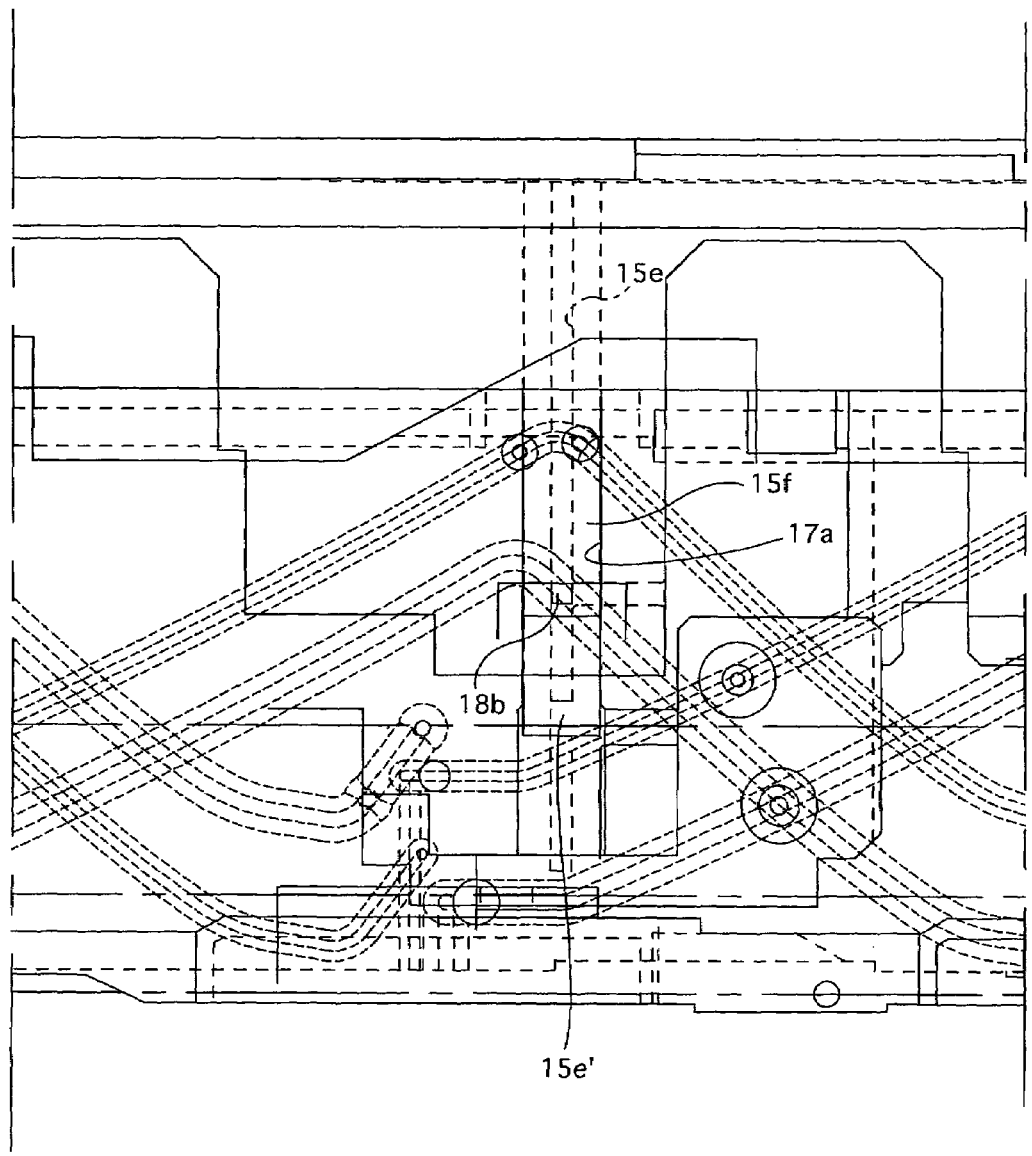
FIG. 18 is an enlarged view of a portion of the developed view shown in FIG. 17.
Figure 19:
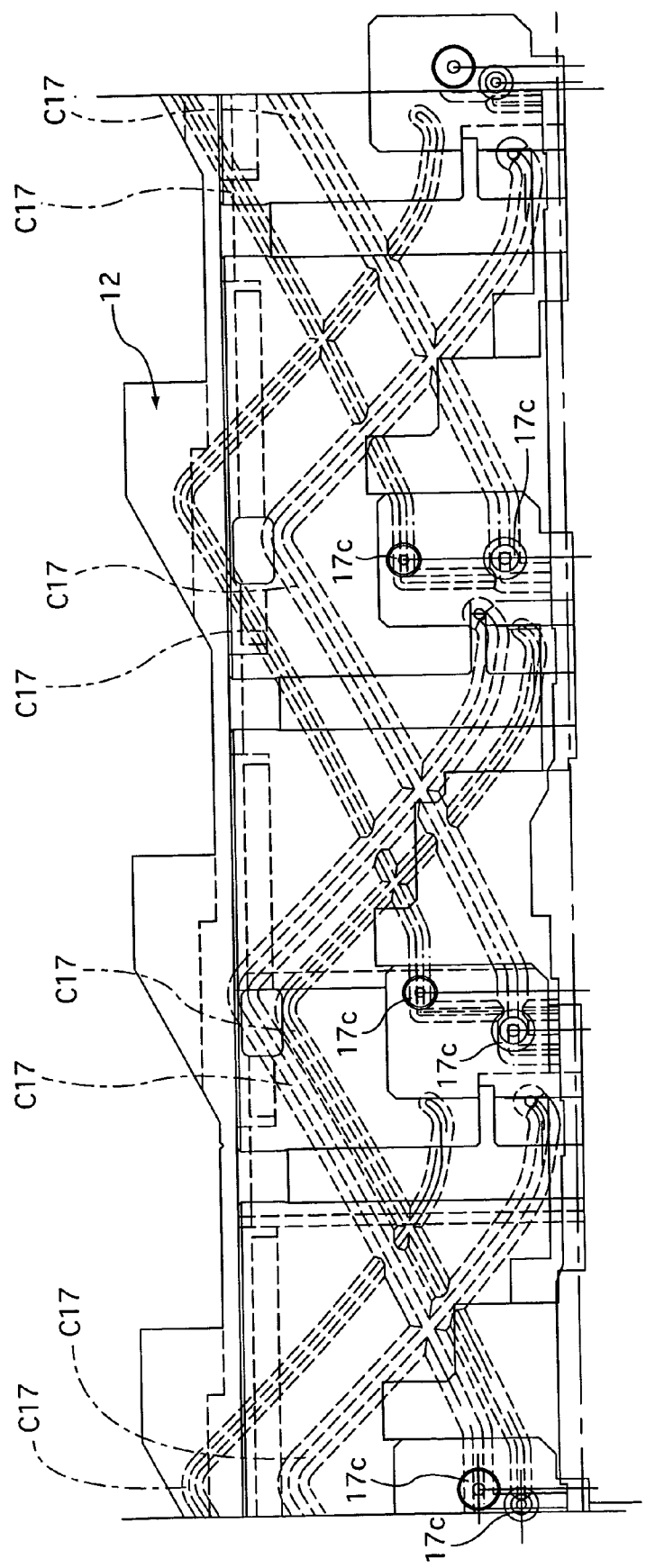
FIG. 19 is a developed view of the cam/helicoid ring, showing the contours of a set of second cam grooves of the cam/helicoid ring for moving the second lens group.

The second lens group moving ring 17 is provided with a set of three linear guide slots (through-slots) 17a which are elongated in a direction parallel to the optical axis O, while the inner ring portion 15Y of the first lens group moving ring 15 is provided on an inner peripheral surface thereof with a set of three linear guide projections 15f which are elongated in a direction parallel to the optical axis O and are engaged in the set of three linear guide slots 17a of the second lens group moving ring 17 from the radially outside thereof in a manner to be freely slidable relative thereto along the optical axis O, respectively (see FIGS. 6, 7 and 17). Each linear guide projection 15f is provided along a substantial center thereof with a hanging groove 15e which is elongated in a direction parallel to the optical axis O and which has a substantially T-shaped cross section as shown in FIG. 6. The rear end of each hanging groove 15e is closed by a circumferential wall 15e' formed at a rear end of the first lens group moving frame 15 (see FIGS. 17, 18, 20, 22 and 23). The second lens group moving ring 17 is provided on an outer peripheral surface thereof with six cam followers 17c which are engaged in the set of six third cam grooves C17 of the cam/helicoid ring 12, respectively. As can be clearly seen in FIGS. 6 and 7, each hanging groove 15e is formed as a through-slot which radially extends through the inner ring portion 15Y of the first lens group moving ring 15.

The zoom lens barrel 10 is provided inside the second lens group moving ring 17 with a third lens group moving ring (inner ring) 18 which supports the third lens group L3. The third lens group moving ring 18 is provided on an outer peripheral surface thereof with a set of three linear guide projections 18a which are elongated in a direction parallel to the optical axis O and which are engaged in the set of three linear guide slots 17a of the second lens group moving ring 17 from the inside thereof in a manner to be freely slidable relative thereto along the optical axis O, respectively. The third lens group moving ring 18 is provided on each linear guide projection 18a at the front end thereof with a linear moving key (stop projection) 18b (see FIGS. 11, 17 and 18), which has a substantially T-shaped cross section and is engaged in the associated hanging groove 15e.

Figure 11:
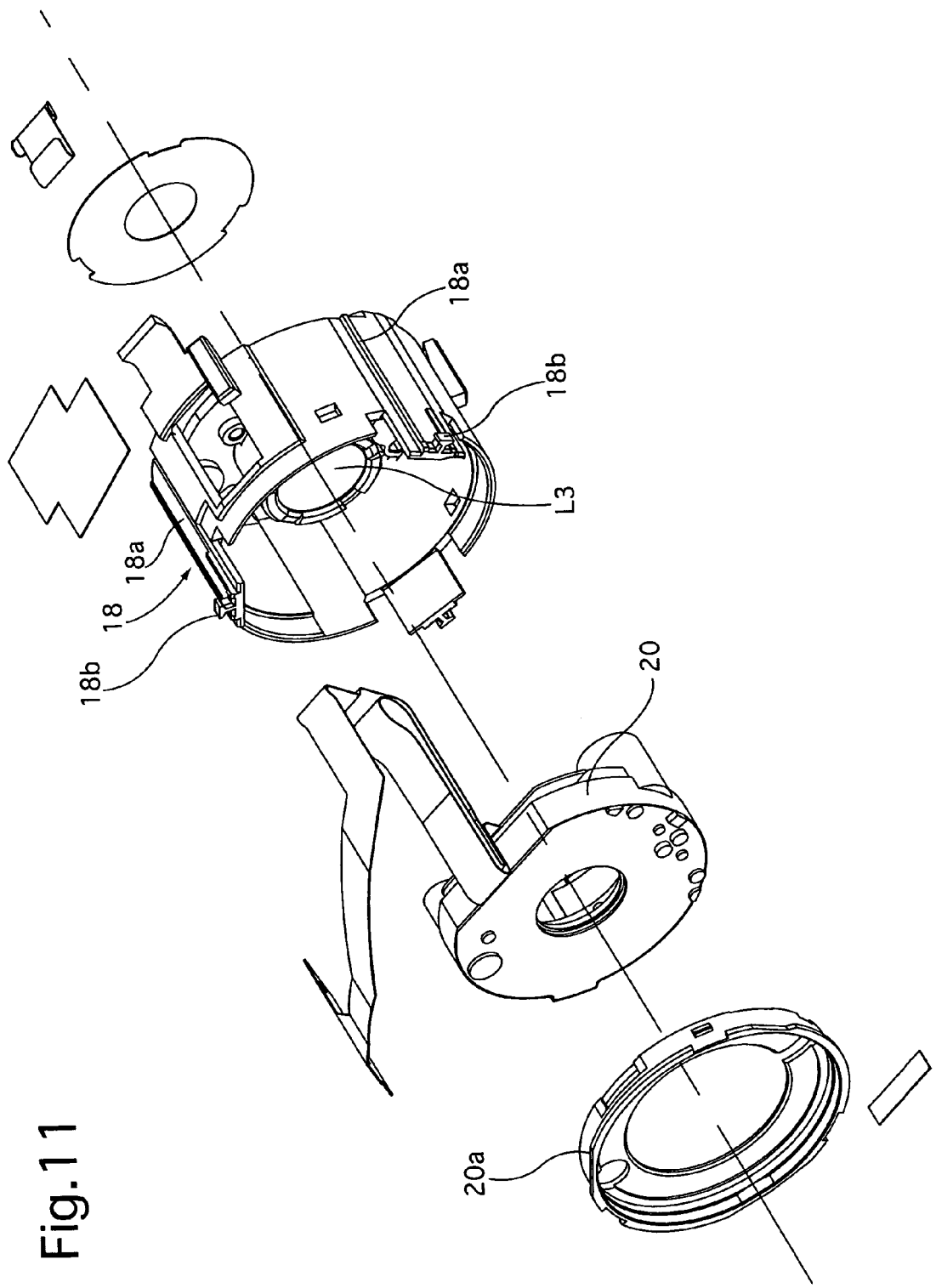
FIG. 11 is an exploded perspective view of a portion of the zoom lens barrel shown in FIG. 3, showing a third lens group moving ring and peripheral elements.

As shown in FIG. 11, the zoom lens barrel 10 is provided with a shutter unit 20 which is inserted into the third lens group moving ring 18 to be positioned in front of the third lens group L3. The shutter unit 20 is fixed to the third lens group moving ring 18 by a fixing ring 20a. The zoom lens barrel 10 is provided between the third lens group moving ring 18 (the fixing ring 20a) and the second lens group moving ring 17 with a compression coil spring 21 which continuously biases the third lens group moving ring 18 rearwards relative to the second lens group moving ring 17.

The rear limit of this rearward movement of the third lens group moving ring 18 relative to the second lens group moving ring 17 is determined by the three linear moving keys 18b contacting with the closed rear ends of the three hanging grooves 15e, respectively. Namely, when the zoom lens barrel 10 is in a ready-to-photograph position, each linear moving key 18b remains in contact with the rear end of the associated hanging groove 15e of the first lens group moving ring 15 to keep the distance between the first lens group L1 and the third lens group L3 constant.

When the zoom lens barrel 10 changes from a ready-to-photograph state to the retracted state shown in FIG. 3, a further rearward movement of the first lens group L1 in accordance with contours of the set of three first cam grooves C15, after the third lens group L3 (the third lens group moving ring 18) has reached the mechanical retracting limit thereof, causes the first lens group L1 to approach the third lens group L3 while compressing the compression coil spring 21 (see FIG. 1). Each linear moving key 18b is formed so that the radially outer end thereof bulges to be prevented from coming off the associated hanging groove 15e.

Although a biasing force of the compression coil spring 21 can be applied directly to the second lens group moving ring 17 (i.e., although the second lens group L2 can be fixed to the second lens group moving ring 17), the second lens group L2 is constructed so as to be capable of moving rearward relative to the second lens group moving ring 17 for the purpose of further reduction in length of the zoom lens barrel 10 in the retracted state thereof in the present embodiment of the zoom lens barrel.

Figure 12:
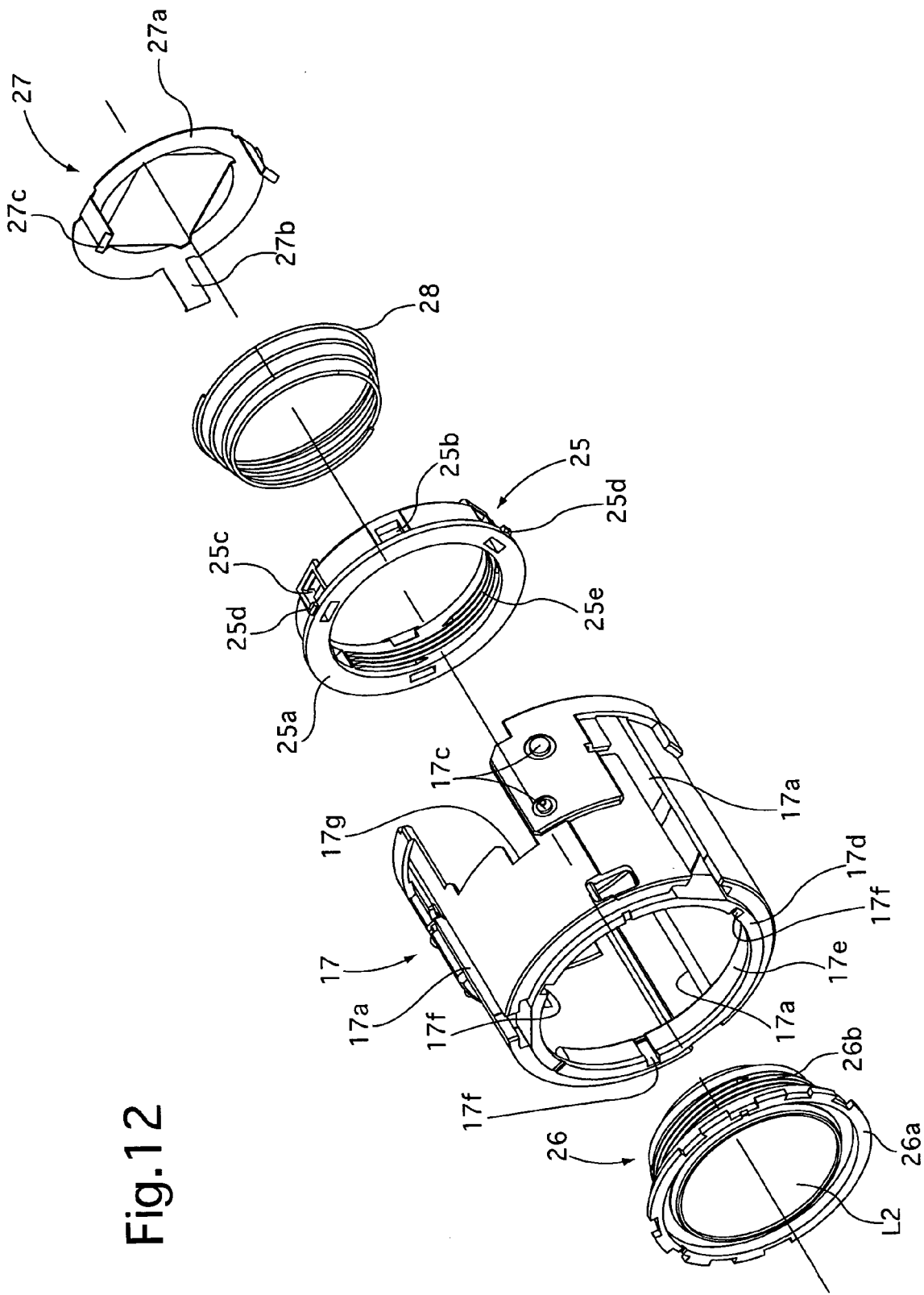
FIG. 12 is an exploded perspective view of a portion of the zoom lens barrel shown in FIG. 3, showing a second lens group moving ring and peripheral elements.
Figure 13:
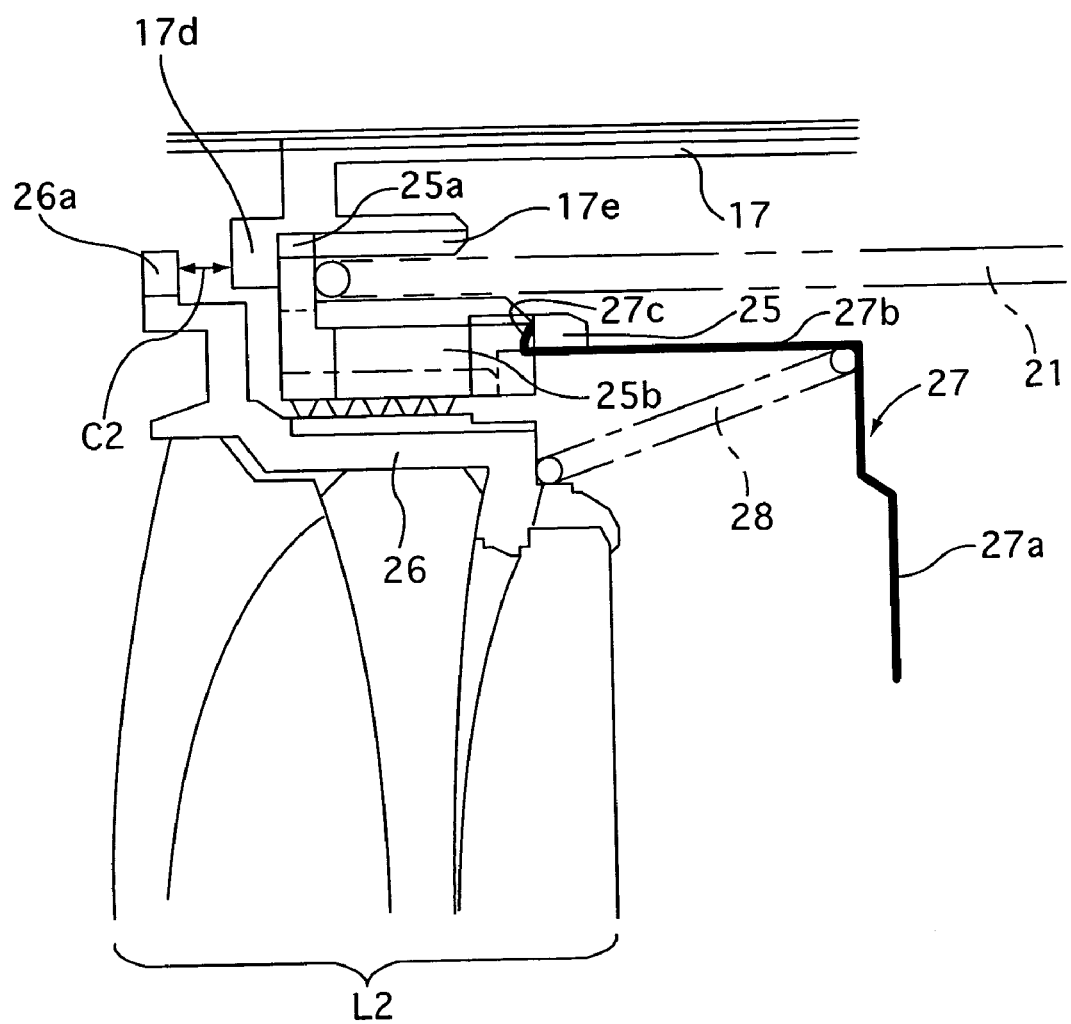
FIG. 13 is a longitudinal view of a portion of the zoom lens barrel shown in FIG. 3, showing a portion of the second lens group moving ring and peripheral elements.
Figure 14:
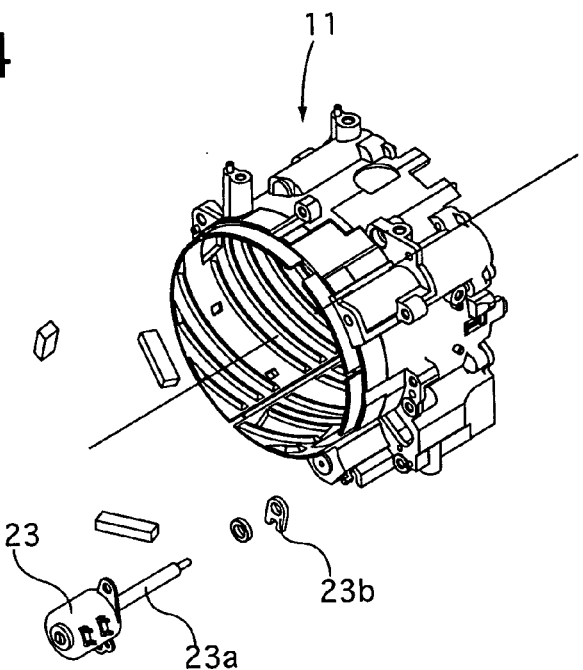
FIG. 14 is an exploded perspective view of a portion of the zoom lens barrel shown in FIG. 3, showing a stationary barrel, a pulse motor supported by the stationary barrel, and peripheral elements, seen from the rear side thereof.
Figure 15:
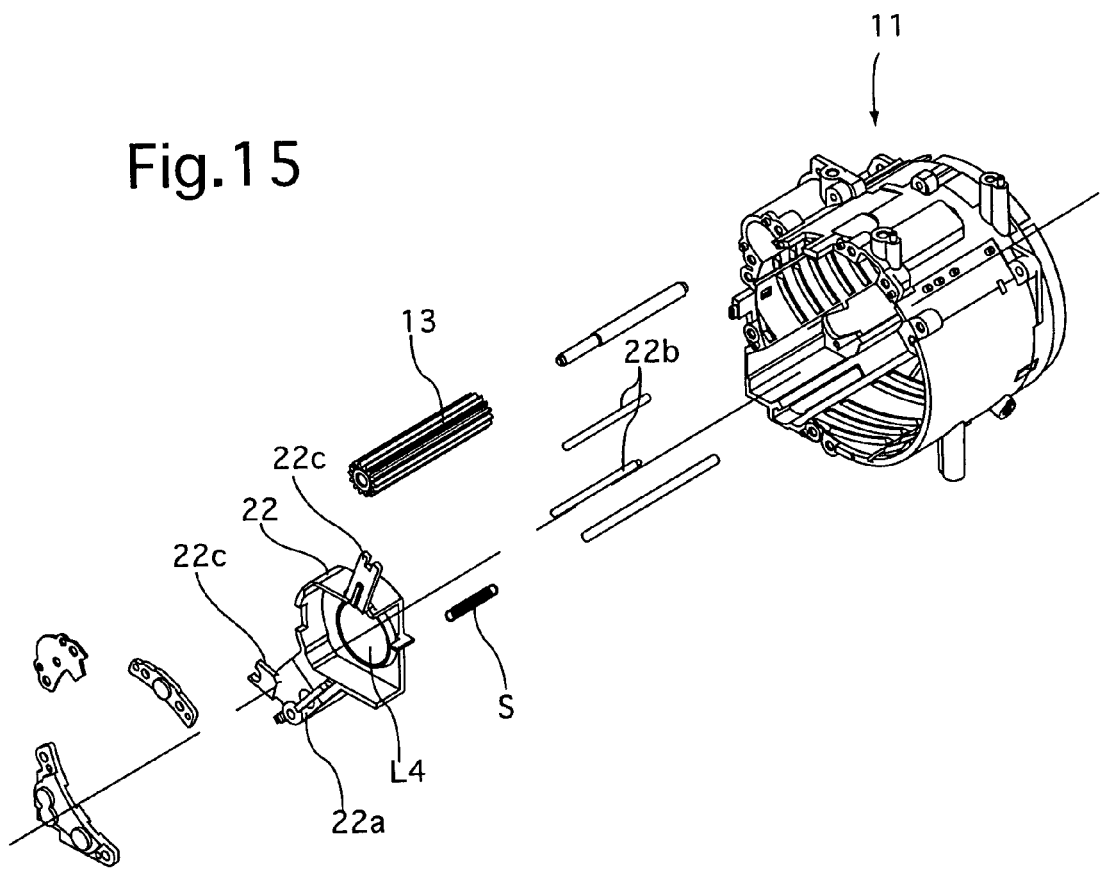
FIG. 15 is an exploded perspective view of a portion of the zoom lens barrel shown in FIG. 3, showing the stationary barrel, a fourth lens group and peripheral elements.

FIGS. 12 and 13 show such a structure for providing further reduction in length of the zoom lens barrel 10. The second lens group moving ring 17 is provided at the front end thereof with a cylindrical portion 17e having an inner flange 17d. Three linear guide grooves 17f, which extend parallel to the optical axis direction and open at the front and rear ends thereof, are formed at equi-angular intervals on the cylindrical portion 17e. The zoom lens barrel 10 is provided inside the second lens group moving ring 17 with an intermediate ring 25. The intermediate ring 25 is provided at the front end thereof with a flange portion 25a which is fitted in the cylindrical portion 17e to be freely slidable on the cylindrical portion 17e in the optical axis direction. Three guide projections 25d which radially extend outwards are provided on the outer peripheral surface of the flange portion 25a. The three guide projections 25d are respectively engaged with the three linear guide grooves 17f of the second lens group moving ring 17 from the rear side of the second lens group moving ring 17. Accordingly, the intermediate ring 25 is prevented from rotating about the optical axis with respect to the second lens group moving ring 17, and can only relatively move in the optical axis direction. The front face of the flange portion 25a can move forwards until sliding contact is made with the rear face of the inner flange 17d.

The zoom lens barrel L2 is provided inside the second lens group moving ring 17 with a second lens group support frame 26 to which the second lens group L2 is fixed. A male thread 26b of the second lens group support frame 26 is screwed into female thread 25e formed on the inner periphery of the intermediate ring 25. Accordingly, the position of the second lens group L2 relative to the intermediate ring 25 which is prevented from rotating about the optical axis can be adjusted in the optical axis direction (zooming adjustment) by rotating the second lens group support frame 26 relative to the intermediate ring 25. After this adjustment, the second lens group support frame 26 can be permanently fixed to the intermediate ring 25 by putting drops of an adhesive agent into a radial through hole 25b formed on the intermediate ring 25.

The second lens group support frame 26 is provided on an outer peripheral surface thereof with an outer flange 26a, and a clearance C2 (see FIG. 13) for the zooming adjustment exits between a front end surface of the inner flange 17d and the outer flange 26a. The compression coil spring 21 biases the intermediate ring 25 forward, and the intermediate ring 25 remains held at a position where the flange portion 25a contacts the inner flange 17d when the zoom lens barrel 10 is in a ready-to-photograph state.

Namely, on the one hand, the position of the second lens group L2 is controlled by the set of six third cam grooves C17 when the zoom lens barrel 10 is in a ready-to-photograph state; on the other hand, the second lens group support frame 26 is pushed rearward mechanically by the rear end of the first lens group support frame 24 to thereby move the outer flange 26a of the second lens group support frame 26 rearward to a point where the outer flange 26a contacts with the inner flange 17d when the zoom lens barrel 10 is retracted to the retracted position thereof. This reduces the length of the zoom lens barrel 10 by a length corresponding to the clearance C2.

The zoom lens barrel 10 is provided immediately behind the intermediate ring 25 with a light shield ring 27 which is supported by the intermediate ring 25. As shown in FIG. 12, the light shield ring 27 is provided with a ring portion 27a and a set of three leg portions 27b which extend forward from the ring portion 27a at intervals of approximately 120 degrees. Each leg portion 27b is provided at the front end thereof with a hook portion 27c which is formed by bending the end of the leg portion 27b radially outwards. The intermediate ring 25 is provided on an outer peripheral surface thereof with a set of three engaging holes 25c, with which the hook portions 27c of the set of three leg portions 27b are engaged, respectively (see FIG. 12).

The zoom lens barrel 10 is provided between the light shield ring 27 and the second lens group support frame 26 with a compression coil spring 28 having a substantially truncated conical shape which continuously biases the light shield ring 27 rearwards. When the zoom lens barrel 10 is retracted toward the retracted position, the light shield ring 27 approaches the second lens group support frame 26 while compressing the compression coil spring 28 after reaching the mechanical retracting limit of the light shield ring 27. The lengths of the set of three engaging holes 25c in the optical axis direction are determined to allow the ring portion 27a to come into contact with the second lens group support frame 26.

The compression coil spring 28 also serves as a backlash-removing device for removing backlash between the intermediate ring 25 and the second lens group support frame 26 when the second lens group support frame 26 is rotated relative to the intermediate ring 25 for the aforementioned zooming adjustment. The zooming adjustment is performed by rotating the second lens group support frame 26 relative to the intermediate ring 25 to adjust the position of the second lens group L2 in the optical axis direction relative to the intermediate ring 25 while viewing the position of an object image. Accordingly, zooming adjustment can be performed with precision with backlash between the intermediate ring 25 and the second lens group support frame 26 being removed by the compression coil spring 28.

The zoom lens barrel 10 is provided behind the third lens group moving ring 18 with a fourth lens group support frame 22 to which the fourth lens group L4 is fixed. As described above, the fourth lens group L4 is moved to make a slight focus adjustment to the vari-focal lens system to adjust a slight focal deviation thereof while the first through third lens groups L1, L2 and L3 are moved relative to one another to vary the focal length of the zoom lens system, and is also moved as a focusing lens group. The fourth lens group L4 is moved along the optical axis O by rotation of a pulse motor 23 (see FIGS. 5 and 14). The pulse motor 23 is provided with a rotary screw shaft 23a. A nut member 23b is screwed on the rotary screw shaft 23a to be prevented from rotating relative to the stationary barrel 11. The nut member 23b is continuously biased by an extension coil spring S (see FIG. 15) in a direction to contact a leg portion 22a which projects radially outwards from the fourth lens group support frame 22. The fourth lens group support frame 22 is prevented from rotating by guide bars 22b which extend in direction parallel to the optical axis direction to be engaged with radial projecting followers 22c of the fourth lens group support frame 22 (see FIGS. 2 and 15).

Accordingly, forward and reverse rotations of the pulse motor 23 cause the fourth lens group support frame 22 (the fourth lens group L4) to move forward and rearward along the optical axis O, respectively. Rotations of the pulse motor 23 are controlled in accordance with information on focal length and/or information on object distance.

Accordingly, in the above described embodiment of the zoom lens barrel, rotating the cam/helicoid ring 12 by rotation of the drive pinion 13 causes the first lens group moving ring 15, the exterior ring 16 and the second lens group moving ring 17 to move along the optical axis O in accordance with contours of the set of three first cam grooves C15, the set of three second cam grooves C16 and the set of six third cam grooves C17, respectively. When the first lens group moving ring 15 moves forward from the retracted position, firstly the three linear moving keys 18b contact the rear ends of the three hanging grooves 15e, respectively, and subsequently the third lens group moving ring 18 moves together with the first lens group moving ring 15 with the three linear moving key 18b remaining in contact with the rear ends of the three hanging grooves 15e, respectively. The position of the fourth lens group L4 is controlled by the pulse motor 23, whose rotations are controlled in accordance with information on the focal length, to make a slight focus adjustment to the vari-focal lens system to adjust a slight focal deviation thereof. As a result, reference moving paths shown in FIG. 1 for performing a zooming operation are obtained. Rotations of the pulse motor 23 are also controlled in accordance with information on object distance to perform a focusing operation.

In the above described embodiment of the zoom lens barrel, the set of three linear guide projections 18a that are formed on the third lens group moving ring 18 are engaged in the set of three linear guide slots 17a that are formed on the second lens group moving ring 17 to be freely slidable thereon, respectively, while the set of three linear moving keys 18b that are formed as projections projecting from the front ends of the set of three linear guide projections 18a pass through the set of three linear guide slots 17a to be engaged in the set of three hanging grooves 15e that are formed as through-slots (through holes) formed on the inner ring portion 15Y of the first lens group moving ring 15, respectively. Additionally, the set of three assembly slots 15c and the set of linear guide slots 15d are formed as through-slots (through holes) on the first lens group moving ring 15, and two rear-end-opened slots 17g are formed on the second lens group moving ring 17 at the rear thereof. Therefore, there is a possibility of harmful light A (see FIGS. 24 and 25) passing through these through holes of the first lens group moving ring 15 to be incident on the picture plane (e.g., an imaging surface of an image pickup device such as a CCD image sensor) that is positioned behind the fourth lens group L4. The harmful light A tends to reach the picture plane, especially when the first lens group moving ring 15, the second lens group moving ring 17 and the third lens group moving ring 18 move away from one other in the optical axis direction to set the zoom lens barrel at a long focal length in a zooming operation.

In the present embodiment of the zoom lens barrel, a ring-shaped light shielding sheet 40 is attached to a rear surface of the third lens group moving ring 18 to prevent the harmful light A which enters into the zoom lens barrel 10 through the first lens group L1 from reaching the picture plane behind the third lens group moving ring 18. The light shielding sheet 40 is shown only in FIGS. 20 through 25.

Figure 20:
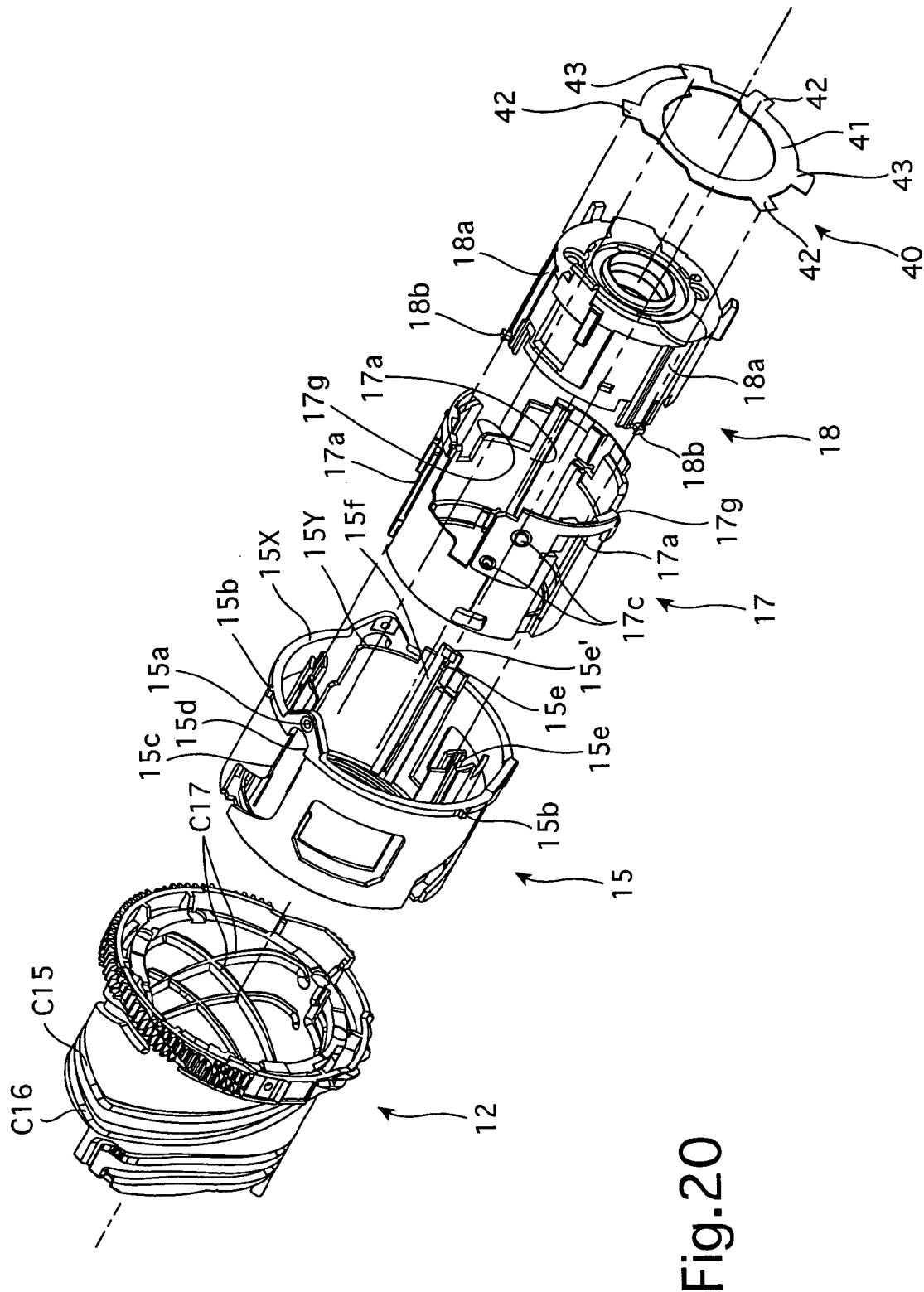
FIG. 20 is an exploded perspective view of a portion of the zoom lens barrel shown in FIG. 3.
Figure 21:
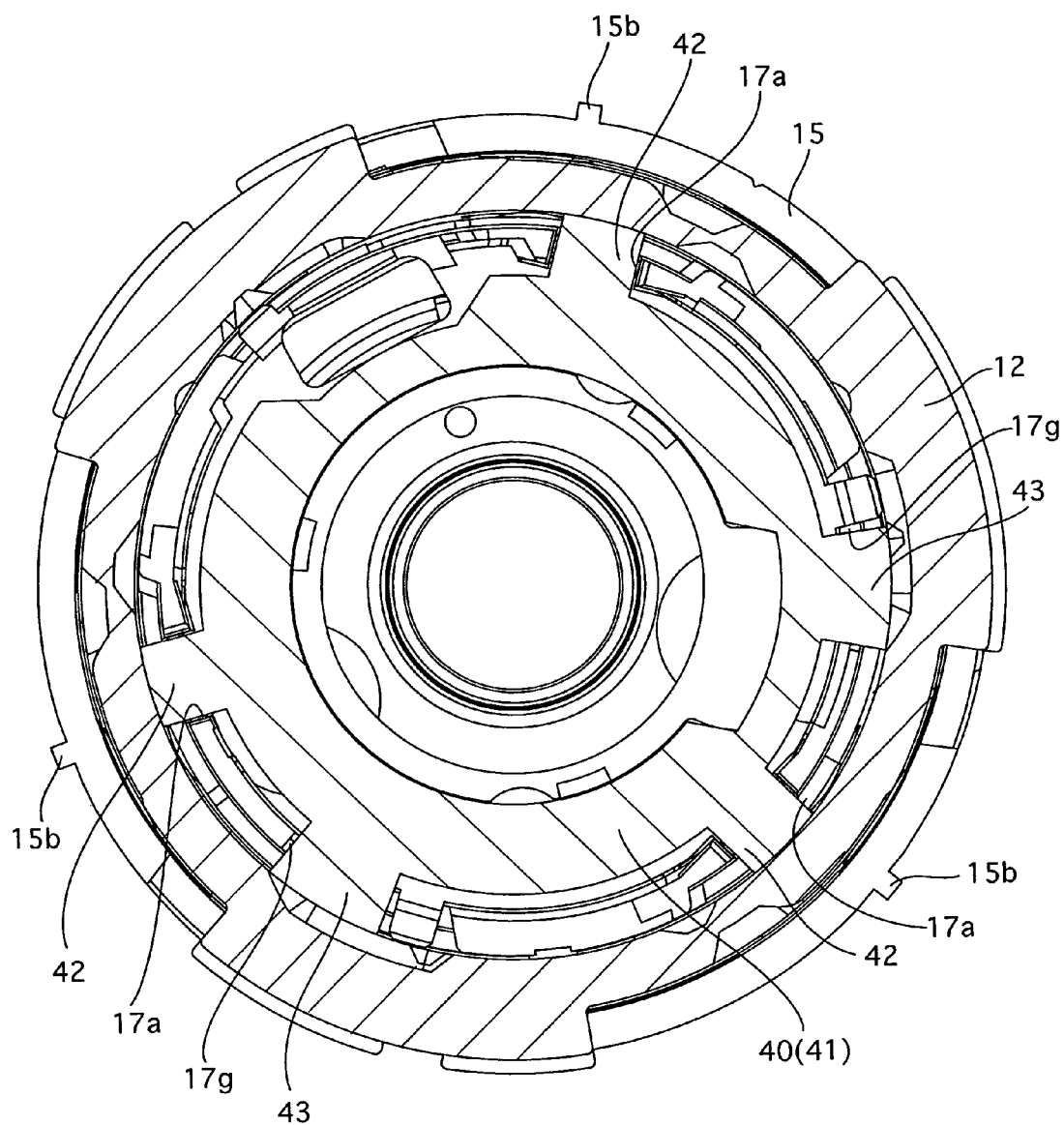
FIG. 21 is a transverse cross sectional view of the third lens group moving ring and peripheral elements, seen from the rear side thereof.

As can be clearly seen in FIG. 20, the light shielding sheet 40 is formed in the shape of a flat plate, and is provided with a ring portion (fixing portion) 41 and five resilient light-shielding tongues which project radially outwards from the ring portion 41. Specifically, these five resilient light-shielding tongues include three resilient light-shielding tongues 42 and two resilient light-shielding tongues 43. The three resilient light-shielding tongues 42 are formed to correspond to the set of three linear guide slots 17a, respectively, while the two resilient light-shielding tongues 43 are formed to correspond to the two rear-end-opened slots 17g, respectively. The ring portion 41 is fixed to a rear surface of the third lens group moving ring 18 by adhesive, and the three resilient light-shielding tongues 42 have a sufficient radial length so that the radially outer end portion of each resilient light-shielding tongue 42 contacts with an inner peripheral surface of the cam/helicoid ring 12, and has resiliency to be resiliently deformed when coming in contact with the inner ring portion 15Y of the first lens group moving ring 15, which is smaller in diameter than the cam/helicoid ring 12. No through holes or slots are formed on at least a portion of the inner peripheral surface of the cam/helicoid ring 12 with which the three resilient light-shielding tongues 42 come in contact. A reinforcing plate can be bonded to the ring portion 41 as needed.

Figure 22:
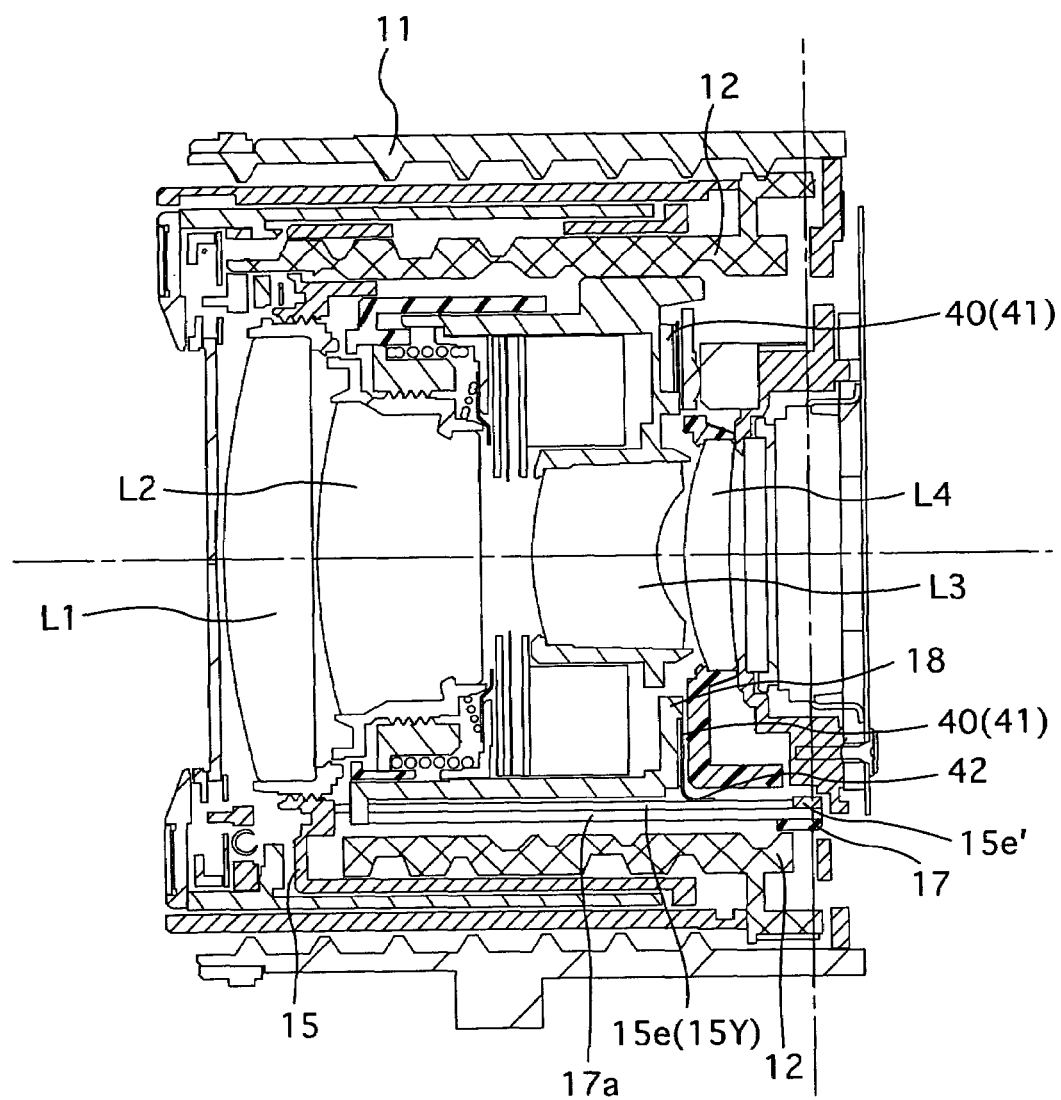
FIG. 22 is a longitudinal sectional view of the zoom lens barrel shown in FIG. 3 in a retracted state, showing a portion of the zoom lens barrel in cross section which includes a linear guide slot.
Figure 23:
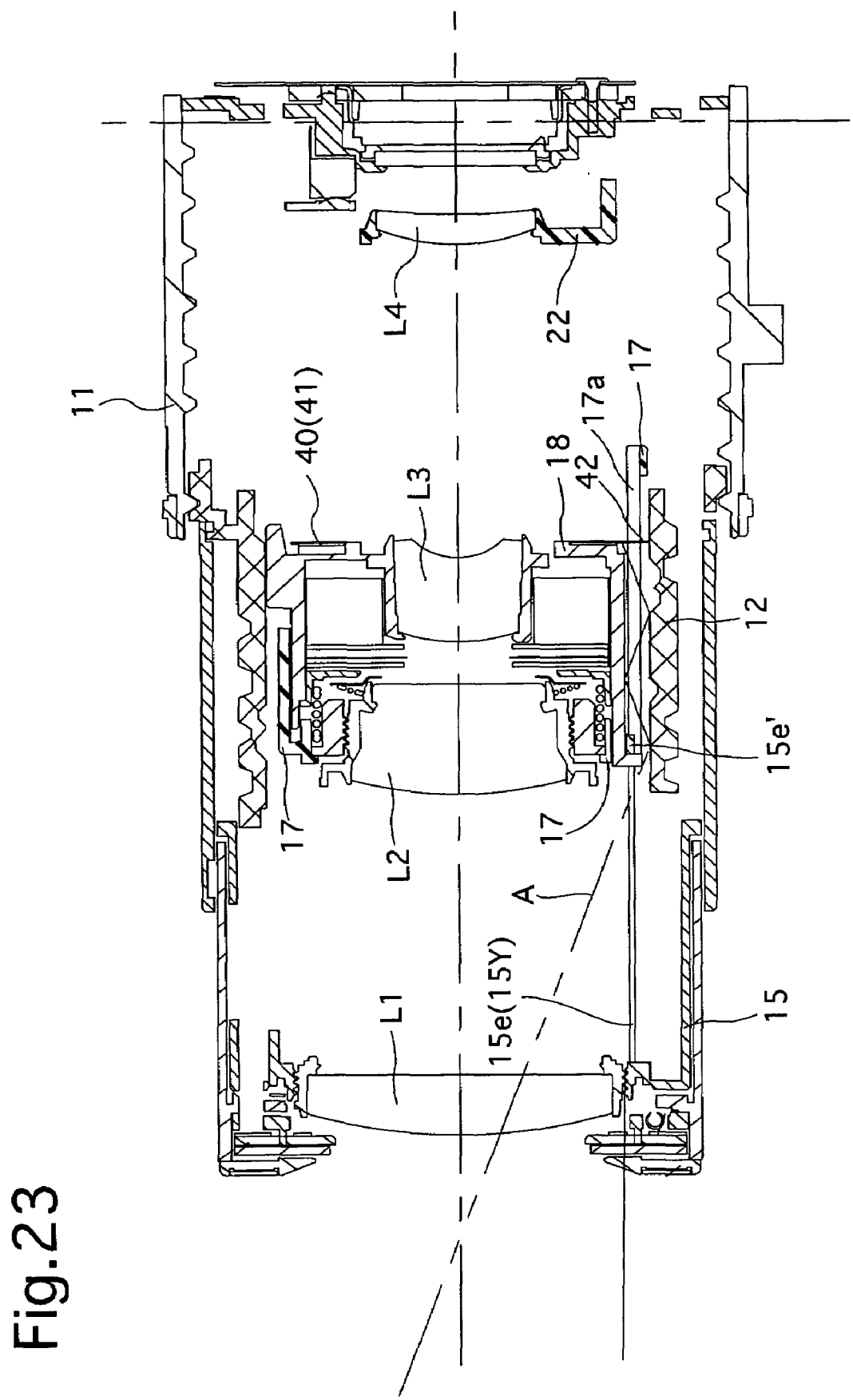
FIG. 23 is a longitudinal sectional view of the zoom lens barrel shown in FIG. 3 in an extended state.

FIGS. 22 and 23 each show a longitudinal sectional view of the zoom lens barrel 10, showing a portion thereof in cross section which includes one of the three resilient light-shielding tongues 42 (showing a portion thereof in cross section which includes one of the three linear guide slots 17a of the second lens group moving ring 17). FIG. 22 shows the zoom lens barrel 10 in the retracted state, and FIG. 23 shows the zoom lens barrel 10 in a fully-extended state. When the zoom lens barrel 10 is retracted to the fully retracted position thereof as shown in FIG. 22, each resilient light-shielding tongue 42 is resiliently deformed by the inner ring portion 15Y of the first lens group moving frame 15 (a portion thereof which includes the hanging groove 15e of one the of three linear guide projections 15f). When the zoom lens barrel 10 moves from this fully retracted state to a ready-to-photograph state, each resilient light-shielding tongue 42 projects outwards through the associated linear guide slot 17a of the second lens group moving ring 17 to come into contact with the inner peripheral surface of the cam/helicoid ring 12 to prevent the harmful light A from reaching the picture plane behind the third lens group moving ring 18 upon the rear end (the circumferential wall 15e') of the inner ring portion 15Y of the first lens group moving frame 15 moving rearward beyond the three resilient light-shielding tongues 42.

Figure 24:
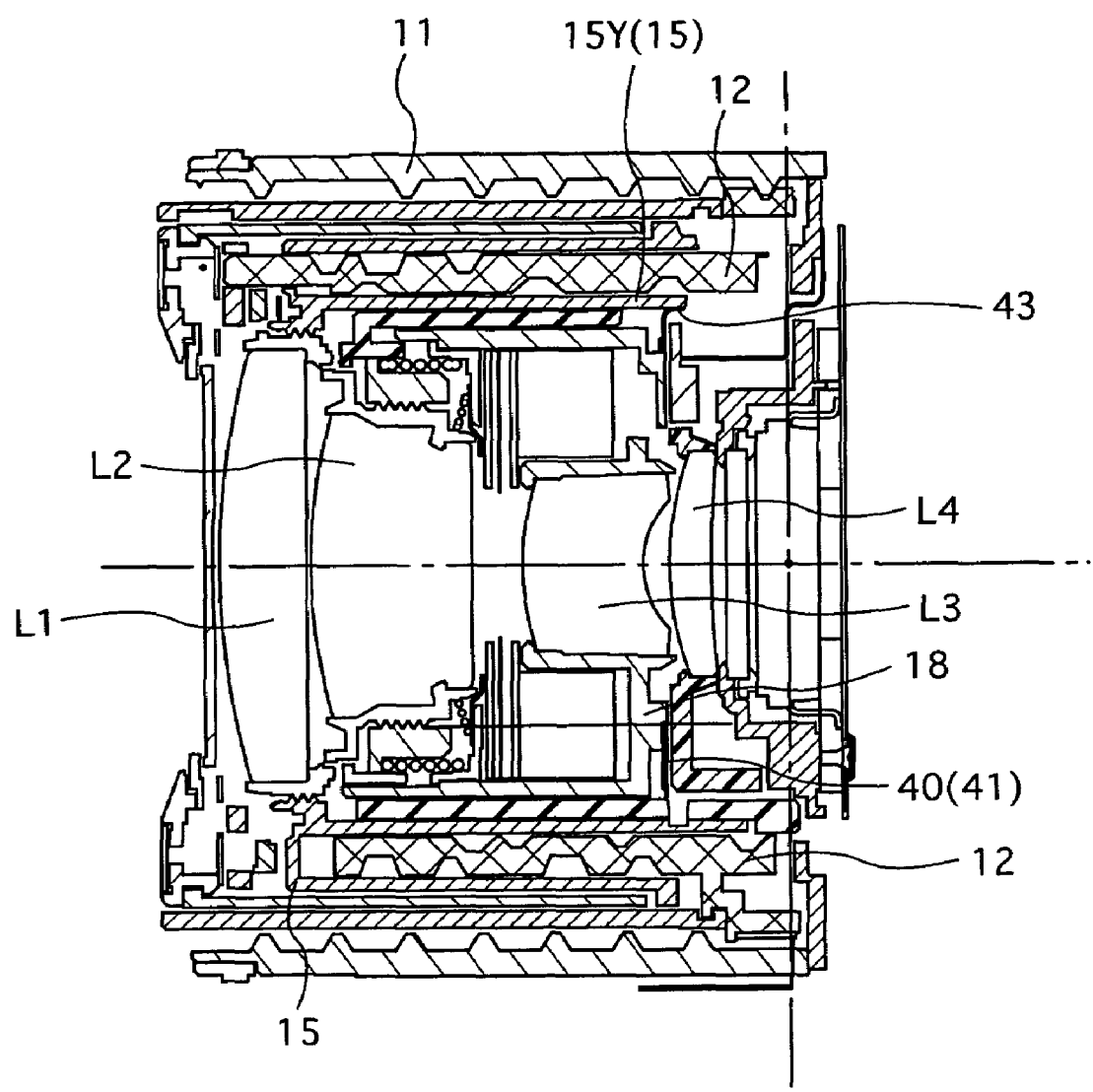
FIG. 24 is a longitudinal sectional view of the zoom lens barrel shown in FIG. 3 in a retracted state, showing a light shielding sheet in cross section taken along a plane different from that in FIGS. 22 and 23.
Figure 25:
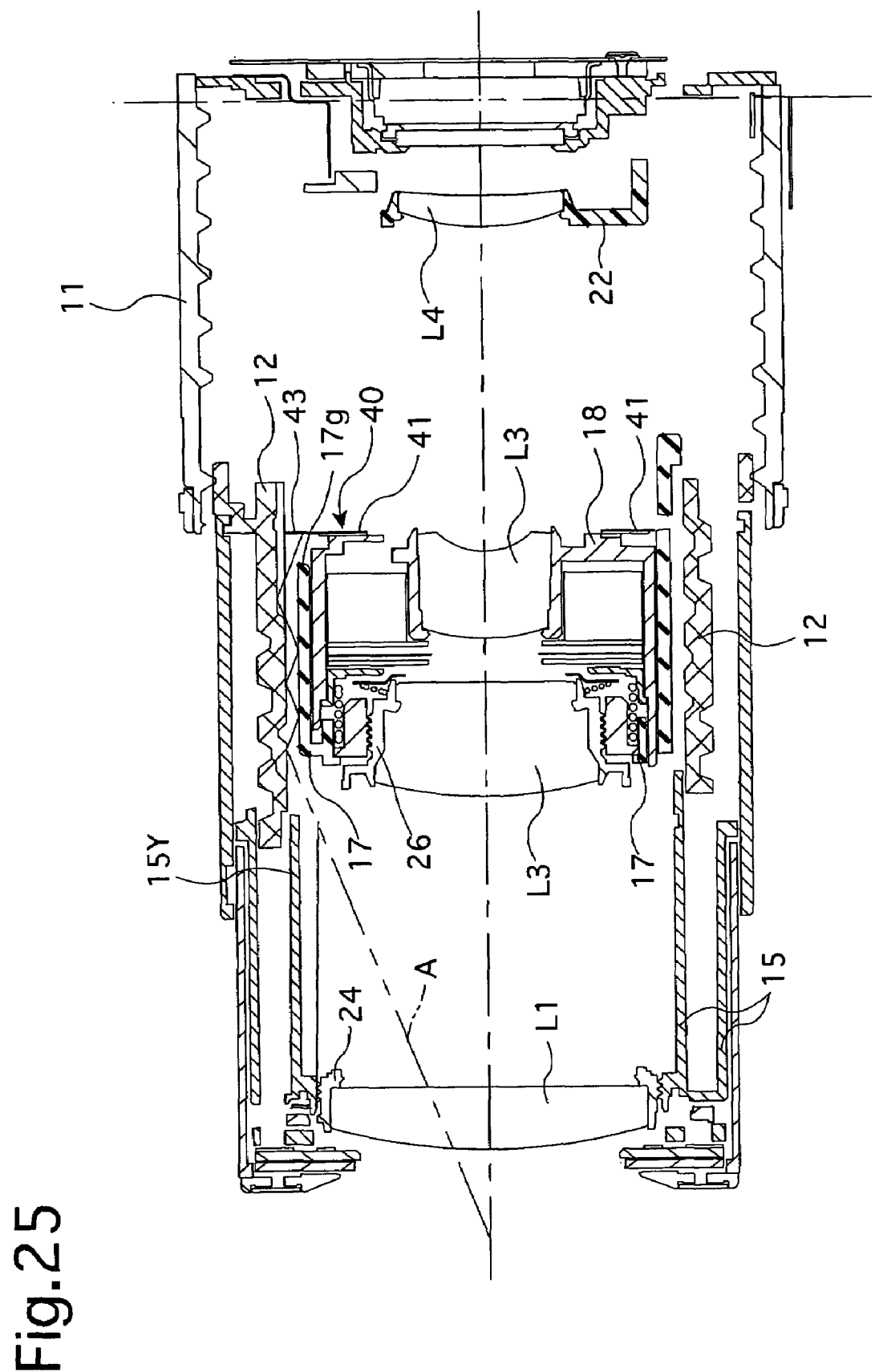
FIG. 25 is a longitudinal sectional view of the zoom lens barrel shown in FIG. 24 in an extended state, taken through a different sectional angle to that shown in FIG. 23.

FIGS. 24 and 25 each show a longitudinal sectional view of the zoom lens barrel 10, showing a portion thereof in cross section which includes one of the two resilient light-shielding tongues 43 (showing a portion thereof in cross section which includes one of the two rear-end-opened slots 17g of the second lens group moving ring 17). FIG. 24 shows the zoom lens barrel 10 in the retracted state, and FIG. 25 shows the zoom lens barrel 10 in the fully-extended state. When the zoom lens barrel 10 is retracted to the fully retracted position thereof as shown in FIG. 24, each resilient light-shielding tongue 43 is resiliently deformed by the inner ring portion 15Y of the first lens group moving frame 15. When the zoom lens barrel 10 moves from this fully retracted state to a ready-to-photograph state, each resilient light-shielding tongue 43 comes into contact with the inner peripheral surface of the cam/helicoid ring 12 to prevent the harmful light A from reaching the picture plane behind the third lens group moving ring 18 upon the rear end (the circumferential wall 15e') of the inner ring portion 15Y of the first lens group moving frame 15 moving rearward beyond the two resilient light-shielding tongues 43.

Neither the harmful light A shown in FIG. 23 nor the harmful light A shown in FIG. 25 reaches the picture plane because such harmful light A is intercepted by the associated resilient light-shielding tongue 42 or 43 of the light shielding sheet 40 in the entire zooming range of the zoom lens barrel 10. According to the present embodiment of the light shielding structure that has the above described structure, the harmful light A which passes through through-slots formed on the first lens group moving ring 15 and the second lens group moving ring 17 can be prevented from reaching the picture plane by a simple light shielding structure in which the light shielding sheet 40 is bonded to the third lens group moving ring 18.

Although each of the two rear-end-opened slots 17g is not entirely closed by the associated resilient light-shielding tongue 43, the remaining portion of each rear-end-opened slot 17g which is not closed by the associated resilient light-shielding tongue 43 can be light-shielded due to the insertion of another element of the zoom lens barrel 10 into the rear-end-opened slot 17g.

The zoom lens barrel which has been discussed above with reference to FIGS. 1 through 25 is an example of an application of a light shielding structure devised according to the present invention. The present invention can be applied not only to a zoom lens barrel such as the above described zoom lens barrel 10, but also to any other zoom lens barrel including an outer ring, an intermediate ring and an inner ring which are concentrically arranged, wherein the intermediate ring is movable relative to the inner outer ring and includes through-slots, the inner ring is movable relative to the intermediate ring, and the inner ring is provided on an inner peripheral surface thereof with linear guide projections which are elongated in a direction parallel to an optical axis and which are engaged in the through-slots of the intermediate ring to be freely slidable thereon.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A light shielding structure of a zoom lens barrel including an outer ring, an intermediate ring and an inner ring which are concentrically arranged, said intermediate ring being movable relative to said outer ring and including at least one through-slot, said inner ring being movable relative to said intermediate ring, and said inner ring including at least one projection which is formed on an outer peripheral surface of said inner ring to be engaged in said through-slot, wherein said light shielding structure is in the form of a light shielding sheet comprising:
a fixing portion which is fixed to said inner ring; and
at least one resilient light-shielding tongue which projects radially outwards from said fixing portion to pass through said through-slot so that a radially outer end portion of said resilient light-shielding tongue comes in contact with an inner peripheral surface of said outer ring.

2. The light shielding structure according to claim 1, further comprising a light shielding sheet deforming frame positioned between said intermediate ring and said outer ring, said light shielding sheet deforming frame moving in an optical axis direction relative to said intermediate ring and said outer ring in accordance with a zooming operation of said zoom lens barrel, wherein said light shielding sheet deforming frame resiliently deforms said resilient light-shielding tongue to change said resilient light-shielding tongue from a first state in which said resilient light-shielding tongue is in contact with said outer ring to a second state in which said resilient light-shielding tongue is in contact with said light shielding sheet deforming frame when said light shielding sheet deforming frame comes into contact with said resilient light-shielding tongue.

3. The light shielding structure according to claim 1, wherein said through-slot is elongated in a direction parallel to an optical axis of said zoom lens barrel to serve as linear guide slot.

4. The light shielding structure according to claim 2, wherein said outer ring comprises a cam ring which is rotated to move said intermediate ring, said inner ring, and said light shielding sheet deforming frame in predetermined respective moving manners thereof, respectively.

5. The light shielding structure according to claim 4, wherein said light shielding sheet deforming frame comprises an inner ring portion and an outer ring portion positioned radially outside of said inner ring portion, wherein said cam ring is positioned between said inner ring portion and said outer ring portion of said light shielding sheet deforming frame, and
wherein said radially outer end portion of said resilient light-shielding tongue is resiliently deformed by said inner ring portion of said light shielding sheet deforming frame.

6. The light shielding structure according to claim 2, wherein said light shielding sheet deforming frame, said intermediate ring and said inner ring comprise a first lens group moving frame, a second lens group moving frame, and a third lens group moving frame, respectively;

wherein said first lens group moving frame, a second lens group moving frame, and a third lens group moving frame support a first lens group, a second lens group and a third lens group, respectively, arranged in that order from an object side.

7. The light shielding structure according to claim 2, wherein said through-slot of the intermediate ring comprises a guide groove which guides the light shielding sheet deforming frame and the inner ring.

8. The light shielding structure according to claim 2, wherein said projection of the inner ring is engaged with said light shielding sheet deforming frame through said through-slot of the intermediate ring.

9. The light shielding structure according to claim 1, wherein said zoom lens barrel is a retractable zoom lens barrel including a lens system, wherein a position of said lens system changes between a ready-to-photograph position and a retracted position.

10. The light shielding structure according to claim 9, wherein said lens system comprises a zoom lens optical system which changes a focal length during a zooming operation, and wherein said light shielding sheet deforming frame, said intermediate ring and said inner ring support three lens groups of said zoom lens optical system, respectively.

11. The light shielding structure according to claim 1, wherein said fixing portion of said light shielding sheet is bonded to a rear surface of said inner ring.

12. The light shielding structure according to claim 1, wherein said projection of said inner ring is elongated in an optical axis direction of said zoom lens barrel, and wherein said fixing portion of said light shielding sheet is fixed to said inner ring behind a rear end of said projection of said inner ring.

13. The light shielding structure according to claim 1, wherein said light shielding sheet deforming frame ring includes at least one through-slot.

14. The light shielding structure according to claim 13, wherein said through-slot of said light shielding sheet deforming frame is elongated in a direction parallel to an optical axis of said zoom lens barrel to serve as a linear guide slot.

15. A zoom lens barrel including an outer ring, an intermediate ring and an inner ring which are concentrically arranged, wherein said intermediate ring is movable relative to said outer ring in an optical axis direction, supports a front lens group, and includes at least one through-slot which is elongated in said optical axis direction, wherein said inner ring is movable relative to said intermediate ring in said optical axis direction, and supports a rear lens group, wherein said inner ring includes at least one linear guide projection which is elongated in said optical axis direction to be engaged in said through-slot, respectively, wherein said zoom lens barrel includes a ring-shaped light shielding sheet which is fixed to said inner ring to be positioned around an optical path of a zoom lens system including said front lens group and a rear lens group, and wherein said ring-shaped light shielding sheet includes at least one resilient light-shielding tongue which projects radially outwards to pass through said through-slot so that a radially outer end portion of said resilient light-shielding tongues comes in contact with an inner peripheral surface of said outer ring.

16. The zoom lens barrel according to claim 15, further comprising an axially-elongated member which is elongated in an optical axis direction between said intermediate ring and said outer ring, and is moved in said optical axis direction relative to said intermediate ring and said outer ring in accordance with a zooming operation of said zoom lens barrel, wherein said axially-elongated member resiliently deforms said resilient light-shielding tongue to change said resilient light-shielding tongue from a first state, in which said resilient light-shielding tongue is in contact with said outer ring, to a second state, in which said resilient light-shielding tongue is in contact with said axially-elongated member when said axially-elongated member comes into contact with said resilient light-shielding tongue.

* * * * *